(12) United States Patent
Kenny

(10) Patent No.: US 6,654,565 B2
(45) Date of Patent: Nov. 25, 2003

(54) SYSTEM AND METHOD FOR INCREASING UPSTREAM COMMUNICATION EFFICIENCY IN AN OPTICAL NETWORK

(75) Inventor: John J. Kenny, Suwanee, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 32 days.

(21) Appl. No.: 10/230,322

(22) Filed: Aug. 28, 2002

(65) Prior Publication Data

US 2003/0007210 A1 Jan. 9, 2003

Related U.S. Application Data

(63) Continuation-in-part of application No. 09/899,410, filed on Jul. 5, 2001.
(60) Provisional application No. 60/315,555, filed on Aug. 28, 2001.

(51) Int. Cl.[7] .............................................. H04B 10/04
(52) U.S. Cl. ................. 398/182; 372/38.02; 372/38.04; 372/38.07
(58) Field of Search ................................. 398/182, 197; 372/38.1, 38.01–38.07

(56) References Cited

U.S. PATENT DOCUMENTS

| | | | | | |
|---|---|---|---|---|---|
| 4,253,035 A | * | 2/1981 | Amitay | ....................... | 326/129 |
| 4,654,891 A | * | 3/1987 | Smith | ......................... | 398/193 |
| 4,733,398 A | * | 3/1988 | Shibagaki et al. | ............ | 372/31 |
| 4,945,541 A | * | 7/1990 | Nakayama | .................... | 372/31 |
| 5,249,194 A | * | 9/1993 | Sakanushi | ................. | 372/38.09 |
| 5,412,498 A | * | 5/1995 | Arstein et al. | .............. | 398/202 |
| 5,706,303 A | * | 1/1998 | Lawrence | ................ | 372/38.02 |
| 5,778,017 A | * | 7/1998 | Sato et al. | ............... | 372/38.02 |
| 5,802,089 A | * | 9/1998 | Link | ....................... | 372/38.02 |
| 5,974,063 A | * | 10/1999 | Yoshida | .................... | 372/38.02 |
| 6,097,159 A | * | 8/2000 | Mogi et al. | ................. | 315/151 |
| 6,151,343 A | * | 11/2000 | Jurgensen | ................ | 372/38.02 |

* cited by examiner

Primary Examiner—Jason Chan
Assistant Examiner—Agustin Bello
(74) Attorney, Agent, or Firm—King & Spalding, LLP

(57) ABSTRACT

An optical transmitter of a subscriber optical interface and an optical receiver of a laser transceiver node can be designed to a frequency of data that is formatted according to a predetermined network protocol, that is encoded with a predetermined coding scheme, and that is transmitted according to a predetermined data transmit timing scheme. The frequency of data is an occupied frequency of a protocol when the data comprises a maximum number of like bits permitted by the protocol. An optical transmitter and optical receiver can be designed to a lowest occupied frequency of data that is encoded with 8B/10B encoding, and that is propagated upstream according to time division multiple access (TDMA). In this way, upstream optical communications can be maximized for speed.

11 Claims, 11 Drawing Sheets

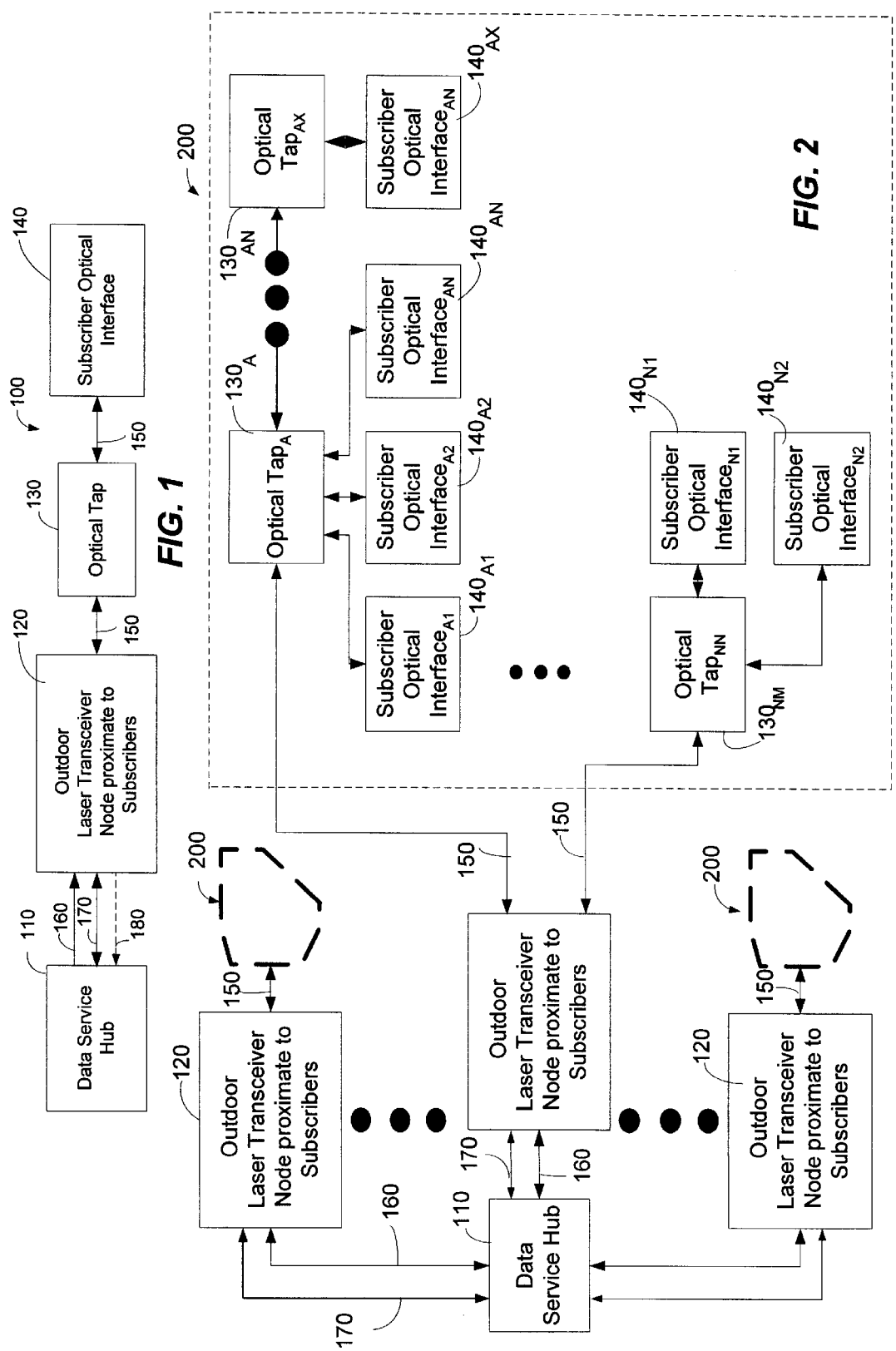

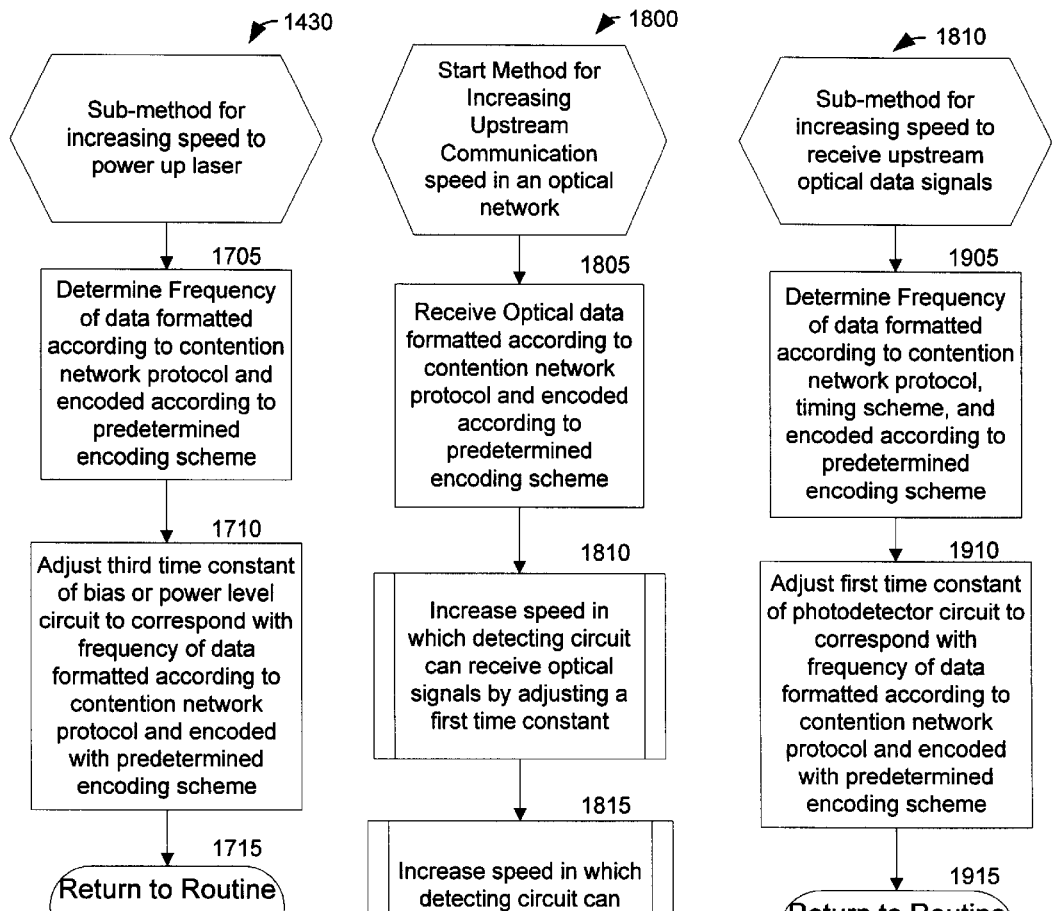

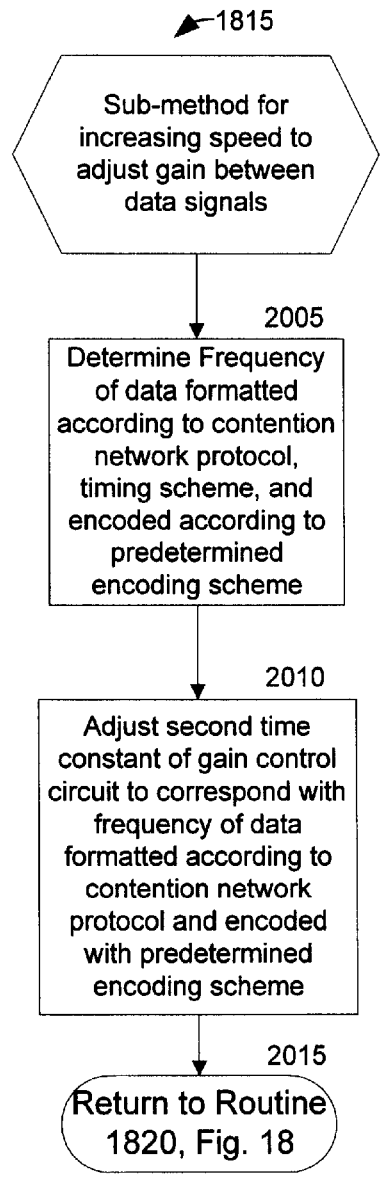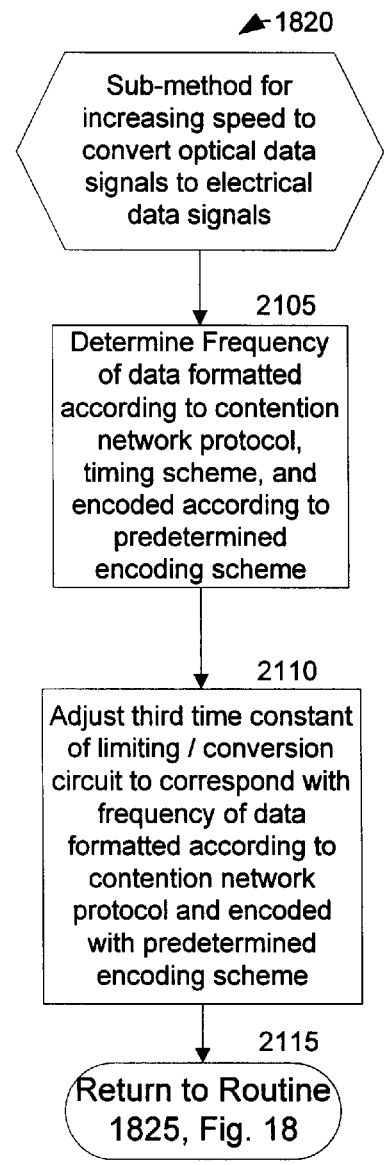
FIG. 20
FIG. 21

SYSTEM AND METHOD FOR INCREASING UPSTREAM COMMUNICATION EFFICIENCY IN AN OPTICAL NETWORK

PRIORITY CLAIM TO PROVISIONAL AND NON-PROVISIONAL APPLICATIONS

The present application is a continuation-in-part of non-provisional patent application entitled "System and Method for Communicating Optical Signals between a Data Service Provider and Subscribers," filed on Jul. 5, 2001 and assigned U.S. application Ser. No. 09/899,410. The present application also claims priority to provisional patent application entitled, "Method for Decreasing the Transition Time of TDMA Systems" filed on Aug. 28, 2001 and assigned U.S. Application Serial No. 60/315,555. The entire contents of both the non-provisional patent application and the provisional patent application mentioned above are hereby incorporated by reference.

TECHNICAL FIELD

The present invention relates to video, voice, and data communications. More particularly, the present invention relates to increasing the speed and efficiency of upstream communications between a data service hub and a subscriber optical interface.

BACKGROUND OF THE INVENTION

The increasing reliance on communication networks to transmit more complex data, such as voice and video traffic, is causing a very high demand for bandwidth. To resolve this demand for bandwidth, communication networks are relying more upon optical fibers to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

This need for increased data transfer rates is fueled by the various types of applications being supported by both optical network architectures and the computers that are connected to them. Applications requiring increased bandwidth and data transfer rates include scientific modeling, engineering, publications, medical data transfer, data warehousing, network back-up applications, desktop video conferencing, and interactive whiteboarding.

Many of these applications require the transmission of large files over a network. File sizes can include hundreds of megabytes to gigabytes. Scientific applications demand ultra-high bandwidth networks to communicate three dimensional visualizations of complex objects ranging from chemical structures to engineering drawings. Magazines, brochures and other complex, full-color publications prepared on desktop computers employ optical networks to transmit data directly to digital-input printing facilities.

Many medical facilities are transmitting complex images over local area networks and wide area networks, enabling the sharing of expensive equipment in specialized medical expertise. Engineers are using electronic and mechanical design automation tools to work interactively and distributed development teams, sharing files in the hundreds of gigabytes. Data warehouses may comprise gigabytes or terabytes of data distributed over hundreds of platforms and accessed by thousands of users, and must be updated regularly to provide users near-real time data for critical business reports and analysis.

To address the enormous bandwidth concerns of the aforementioned applications, point to multipoint optical networks architectures have been contemplated. With such optical network architectures, data transfer upstream from the multipoints to the point often requires the use of predetermined timing schemes, such as time division multiple access (TDMA).

Under the predetermined timing scheme of TDMA, multiple data sources must start and stop transmitting data rather quickly during a predefined interval. With conventional optical transmitters, a certain amount of time within any TDMA scheme must be allocated to allow an optical transmitter to power up to an operating level for data transmission and then to power down at the end of a data transmission. Further, additional time must be allocated in any TDMA scheme for allowing an optical receiver to adjust itself when receiving different signals from optical transmitters that may have different properties (such as signal strength, noise, and other factors).

This allocation of transition times within any TDMA timing scheme decreases efficiency of data transfer, due to reduction of the rate at which data is transferred from multipoints to a single point in an upstream direction. The aforementioned problems are linked to the hardware supporting the optical communications. This hardware is needed to support a very popular and conventional broadband networking standard referred to as the synchronous optical network (SONET). A standard similar to SONET is referred to as the synchronous digital hierarchy (SDH) outside of the United States.

The majority of optical transmitters and receivers are designed to propagate data that is formatted according to the SONET transmission standard. One of the problems associated with the SONET transmission standard that accentuates or magnifies the limitations of current conventional optical transmitters and receivers is that the minimum frequency content of data formatted according to the SONET standard can extend to very close to zero by virtue of the SONET standard permitting the transmission of up to 72 or more bits of the same type (the 1 or 0).

In other words, the SONET transmission standard could potentially format data such that a string of 72 or more bits could be propagated that does not have a change in state. Such a transmission state of identical or similar bits requires the optical transmitters and the optical receivers to be designed at very low frequencies compared to or relative to other network protocols.

Another problem and drawback of conventional optical transmitters and optical receivers is that such equipment can have costs that approach (at the time of the writing of this text) of upward of hundreds of thousands of dollars. Accordingly, in light of the problems identified above with respect to conventional network protocols and conventional optical equipment, there is a need in the art for a method and system for efficient propagation of data and broadcast signals over an optical network. There is a need in the art for a method and system that can increase the speed in which optical transmitters and optical receivers can handle data in an upstream direction relative to a subscriber and a data service hub. Specifically, a need exists in the art for a method and system that can increase the speed at which data is transmitted from multiple points to a single point, by reducing wasted time spent switching transmission from one point to another.

A further need exists in the art for optical receivers that have increased speed to switch from receiving signals from one optical transmitter to another optical transmitter. And lastly, there is a need in the art to provide optical network equipment that can support an optical network protocol at a substantially reduced cost compared to the equipment needed to operate conventional network protocols such as SONET.

SUMMARY OF THE INVENTION

The present invention is generally drawn to a system and method for efficient propagation of data and broadcast signals over an optical network. More specifically, the present invention is generally drawn to a method and system that increases the speed in which optical transmitters and optical receivers can handle data in an upstream direction relative to a subscriber and a data service hub.

According to one exemplary aspect of the present invention, an optical network architecture can include a laser transceiver node and a subscriber optical interface. The laser transceiver node can comprise an optical receiver that can convert upstream optical signals received from the subscriber optical interface into upstream electrical signals destined for a data service hub. Meanwhile, the subscriber optical interface can comprise an optical transmitter such as a laser operating according to a predetermined timing scheme that produces the upstream optical signals received by the optical receiver housed in the laser transceiver node.

Both the optical transmitter of the subscriber optical interface and the optical receiver of the laser transceiver node can handle a frequency of data that is formatted according to a predetermined network protocol that is encoded with a predetermined coding scheme, and that is transmitted according to a predetermined data transmit timing scheme.

A frequency of the data transmitted according to the predetermined protocol can comprise an occupied frequency of a protocol that is defined as the lowest frequency of a frequency spectrum when the data comprises a maximum number of like bits permitted by the predetermined network protocol. The optical transmitter and optical receiver can have time constants that are adjusted according to this lowest occupied frequency of data when data is formatted according to the predetermined network protocol that can comprise Gigabit Ethernet (part of the IEEE 802.3 standard), that is encoded with 8B/10B encoding, and that is propagated upstream according to time division multiple access (TDMA).

In other words, the high frequency circuits present in the optical transmitter and optical receiver can have time constants that can be adjusted for maximum efficiency when supporting data formatted according to the predetermined network protocol comprising Gigabit Ethernet with 8B/10B encoding and that is transmitted according to TDMA.

Similarly, the time constant of a power level circuit of each optical transmitter can be adjusted to increase the speed to power up a laser that generates the optical signals corresponding to the data. Other high frequency circuits of each optical receiver can have time constants that are adjusted to maximize efficiency for receiving the predetermined network protocol comprising Gigabit Ethernet with 8B/10B encoding according to a predetermined timing scheme. Other high frequency circuits can include, but are not limited to, an optical detector circuit, an optional automatic gain control circuit, and a limiting/conversion circuit.

Specifically, the optical receiver of the laser transceiver node can be optimized for maximum efficiency when handling upstream data formatted according to Gigabit Ethernet with 8B/10B encoding and a predetermined timing scheme such as TDMA. When the optical receiver's high frequency circuits have time constants that are adjusted to a specific frequency or range of frequencies, the device can rapidly switch from receiving signals from one optical transmitter to another. In other words, the optical receiver can make necessary adjustments such as gain control more quickly when receiving optical signals from different optical transmitters.

The quality of received optical signals generated by each optical transmitter can vary because of the different relative distances the optical signals are transmitted over an optical network. Other factors that can cause optical signals generated by one transmitter to be different from another transmitter can include laser power variation, optical component loss variation, and other similar factors known in the art. Further, an optical transmitter usually does not transmit readable data when the transmitter first starts transmitting. The optical receiver usually needs to make adjustments to compensate for the differences in the optical signals in order to accurately convert the optical signals into the electrical domain.

For each high frequency circuit mentioned above, adjusting of the time constant can comprise adjusting capacitance values to correspond to the frequency of data propagated according to the predetermined network protocol comprising Gigabit Ethernet with 8B/10B encoding and a predetermined timing scheme such as TDMA, according to one exemplary embodiment. This usually means that the high pass time constants of each high frequency circuit can be set lower than time constants designed to handle data formatted according to different conventional protocols such as SONET.

The lower time constants achieved according to the present invention generally correspond with data formatted according to a predetermined network protocol comprising Gigabit Ethernet with 8B/10B encoding and TDMA. However, other network protocols, encoding, and data transmit timing schemes for propagating data are not beyond the scope of the present invention. For example, other network protocols can include, but are not limited to, Fiber Distributed Data Interface (FDDI) and Digital Video Broadcasting-Asynchronous Serial Interface (DVB-ASI). Other encoding schemes can include, but are not limited to, 16B/18B and 64B/66B encoding. Meanwhile, other data transmit timing schemes can include, but are not limited to, time division multiplexing (TDM) or code division multiple access (CDMA).

By adjusting the time constants mentioned above, the present invention can increase the operating speeds for both the optical transmitter housed in the subscriber optical interface and the optical receiver housed in the laser transceiver node. Specifically, when the time constants of the optical transmitter are adjusted, data transmission can be increased since the delays normally attributed to start-up and power down times for the optical transmitter can be significantly reduced. This start up and power down time reduction for an optical transmitter can substantially improve data transmission rates when optical transmitters share bandwidth according to data transmit timing schemes such as time division multiple access (TDMA).

BRIEF DESCRIPTION OF THE DRAWINGS

FIG. 1 is a functional block diagram of some core components of an exemplary optical network architecture according to the present invention.

FIG. 2 is a functional block diagram illustrating an exemplary optical network architecture for the present invention.

FIG. 17 is a logic flow diagram illustrating a subprocess for increasing speed to power up a laser for optical transmissions according to one exemplary embodiment of the present invention.

FIG. 18 is a logic flow diagram illustrating an exemplary method for increasing upstream communication speed in an optical network from the vantage point of an optical receiver according to another exemplary embodiment of the present invention.

FIG. 19 is a logic flow diagram illustrating an exemplary subprocess for increasing speed to receive upstream optical data signals.

FIG. 20 is a logic flow diagram illustrating an exemplary subprocess for increasing speed to adjust gain between data signals.

FIG. 21 is a logic flow diagram illustrating a subprocess for increasing speed to convert optical data signals to electrical data signals.

DETAILED DESCRIPTION OF EXEMPLARY EMBODIMENTS

Figure 3:
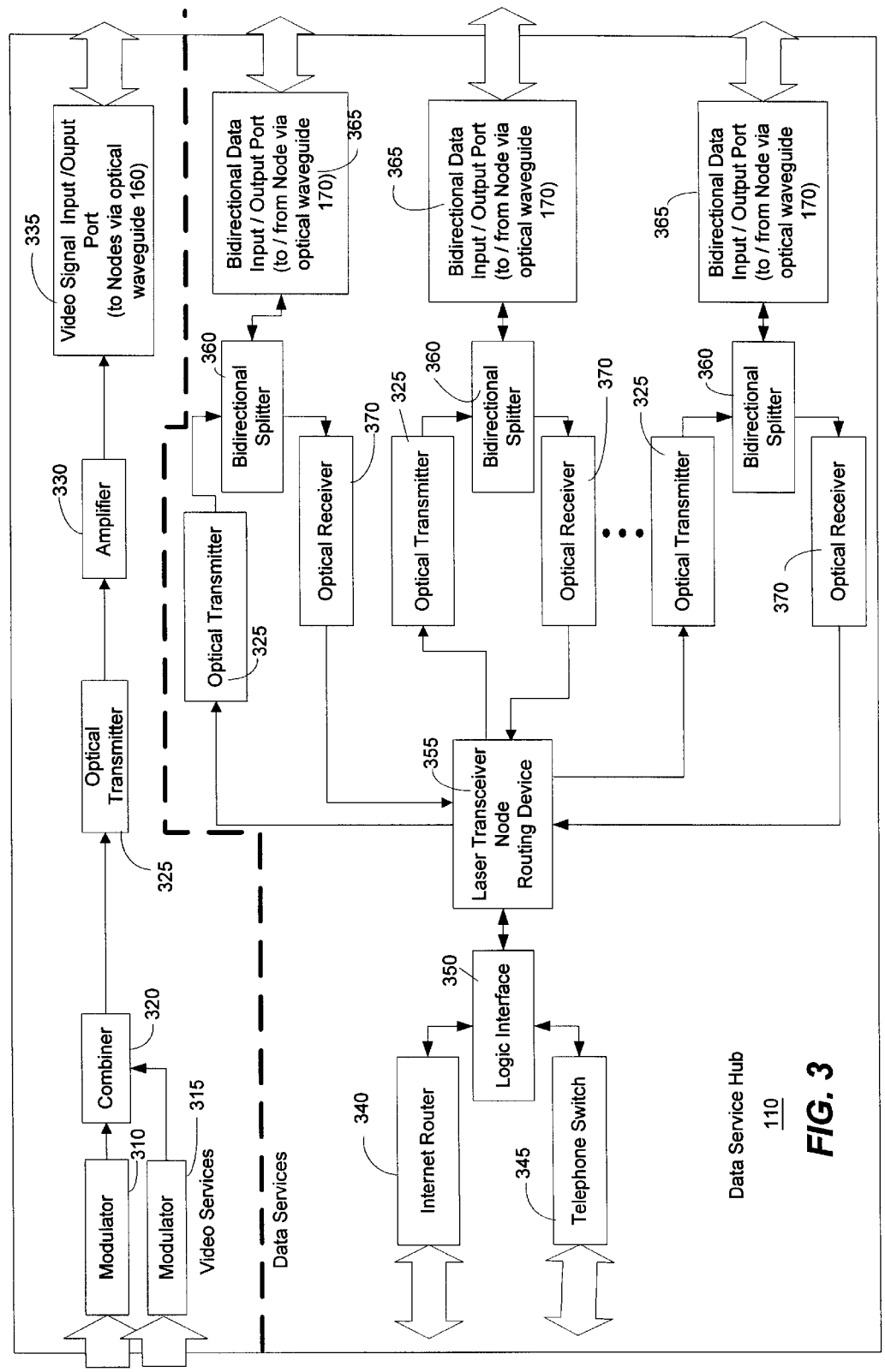
FIG. 3 is a functional block diagram illustrating an exemplary data service hub of the present invention.

An optical transmitter of a subscriber optical interface and an optical receiver of a laser transceiver node can have time constants adjusted to a frequency of data that is formatted according to a predetermined network protocol, that is encoded with a predetermined coding scheme, and that is transmitted according to a predetermined data transmit timing scheme. A network protocol according to the present invention can comprise a network protocol that breaks up data into packets The high frequency circuits present in the optical transmitter and optical receiver of the present invention can be adjusted for maximum efficiency when supporting data formatted according to a predetermined network protocol comprising Gigabit Ethernet, with a predetermined encoding scheme of 8B/10B encoding, and data that is transmitted according to a predetermined data timing scheme comprising TDMA. Specifically, the time constants of two driver circuits of respective optical transmitters can be adjusted to increase the speed to convert turn the transmitter on and off.

Referring now to the drawings, in which like numerals represent like elements throughout the several Figures, aspects of the present invention and the illustrative operating environment will be described.

Illustrative Operating Environment

FIG. 1 is a functional block diagram illustrating an exemplary optical network architecture 100 according to the present invention. The exemplary optical network architecture 100 comprises a data service hub 110 that is connected to one or more outdoor laser transceiver nodes 120. The laser transceiver nodes 120, in turn, are connected to optical taps 130. The optical taps 130 can be connected to a plurality of subscriber optical interfaces 140.

Between respective components of the exemplary optical network architecture 100 are optical waveguides such as optical waveguides 150, 160, 170 and 180. The optical waveguides 150–180 are illustrated by arrows with the arrowheads of the lines illustrating exemplary directions of the data flow between respective components of the illustrative and exemplary optical network 100.

While only an individual laser transceiver node 120, an individual optical tap 130, and an individual subscriber optical interface 140 are illustrated in FIG. 1, as will become apparent from FIG. 2, in its corresponding description, a plurality of laser transceiver nodes 120, optical taps 130, and subscriber optical interfaces 140 can be employed without departing from the scope and spirit of the present invention. Typically, in many of the exemplary embodiments of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole." The outdoor laser transceiver node can operate in a temperature range between minus 40 degrees Celsius to plus 60 degrees Celsius. The laser transceiver node 120 can operate in this temperature range by using passive cooling devices that do not consume power.

In one exemplary embodiment of the present invention, three trunk optical waveguides 160, 170, and 180 (that can comprise optical fibers) can conduct optical signals from the data service hub 110 to the outdoor laser transceiver node 120. It is noted that the term "optical waveguide" used in the present application can apply to optical fibers, planar light guide circuits, and fiber optic pigtails and other like optical waveguides.

A first optical waveguide 160 can carry broadcast video and other signals. The signals can be carried in a traditional cable television format wherein the broadcast signals are modulated onto carriers, which in turn, modulate an optical transmitter (not shown) in the data service hub 110. A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this figure is a functional block diagram illustrating an exemplary optical network architecture 100.

Each optical tap 130 can comprise an optical splitter. The optical tap 130 allows multiple subscriber optical interfaces 140 (such as single subscriber optical interfaces 140B or multiple or multi-subscriber optical interfaces 140A) to be coupled to a single optical waveguide 150 that is connected to the outdoor laser transceiver nodes 120. In one exemplary embodiment, six optical fibers 150 are designed to be connected to the outdoor laser transceiver nodes 120. For the use of optical taps 130, sixteen subscribers can be assigned to each of the six optical waveguides 150 that are connected to the outdoor laser transceiver nodes 120.

In another exemplary embodiment, twelve optical fibers 150 can be connected to a respective outdoor laser transceiver node 120 while eight subscriber optical interfaces 140 are assigned to each of the twelve optical waveguides 150. Those skilled in the art will appreciate the number of subscriber optical interfaces 140 assigned to a particular waveguide 150 that is connected between the outdoor laser transceiver nodes 120 and a subscriber optical interface 140 (by way of the optical tap 130) can be varied or changed without departing from the scope and spirit of the present invention. Further, those skilled in the art recognize that the actual number of subscriber optical interfaces 140 assigned to a particular optical waveguide is dependent upon the amount of power available on a particular optical waveguide 150.

As depicted in FIG. 2, many configurations for supplying communication services to subscribers are possible. The combinations of optical taps 130 with other optical taps 130 are limitless. With the optical taps 130, concentrations of distribution optical waveguide 150 at the laser transceiver nodes 120 can be reduced. Additionally, the total amount of fiber needed to service the subscriber grouping attached to a subscriber optical interface 140 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, the second optical waveguide 170 supports bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a combiner 320 where they are supplied to an optical transmitter 325 where the radio frequency signals generated by the modulators 310, 315 are converted into optical form.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter (often referred to as the unidirectional optical signals) are propagated to amplifier 330 such as an Erbium Doped Fiber Amplifier (EDFA) where the unidirectional optical signals are amplified. The amplified unidirectional optical signals are then propagated out of the data service hub 110 via a unidirectional signal output port 335 which is connected to one or more first optical waveguides 160.

The unidirectional signal output port 335 is connected to one or more first optical waveguides 160 that support unidirectional optical signals originating from the data service hub 110 to a respective laser transceiver node 120. The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110.

If only Internet Protocol telephony is supported by the data service hub 110, then it is apparent to those skilled in the art that the telephone switch 345 could be eliminated in favor of lower cost Voice over Internet Protocol (VoIP) equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional means of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one half gigabit or faster Ethernet. However, the present invention is not limited to this protocol. Other network protocols can be used without departing from the scope and spirit of the present invention. For example, other network protocols can include, but are not limited to, Fiber Distributed Data Interface (FDDI) and Digital Video Broadcasting-Asynchronous Serial Interface (DVB-ASI).

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bidirectional optical data signals between the data service hub 110 and a respective laser transceiver node 120. Upstream optical signals received from a respective laser transceiver node 120 can be fed into the bi-directional data input/output port 365 where the optical signals are then forwarded to the bi-directional splitter 360.

From the bi-directional splitter 360, respective optical receivers 370 can convert the upstream optical signals into the electrical domain. The upstream electrical signals generated by respective optical receivers 370 are then fed into the laser transceiver node routing device 355. Each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
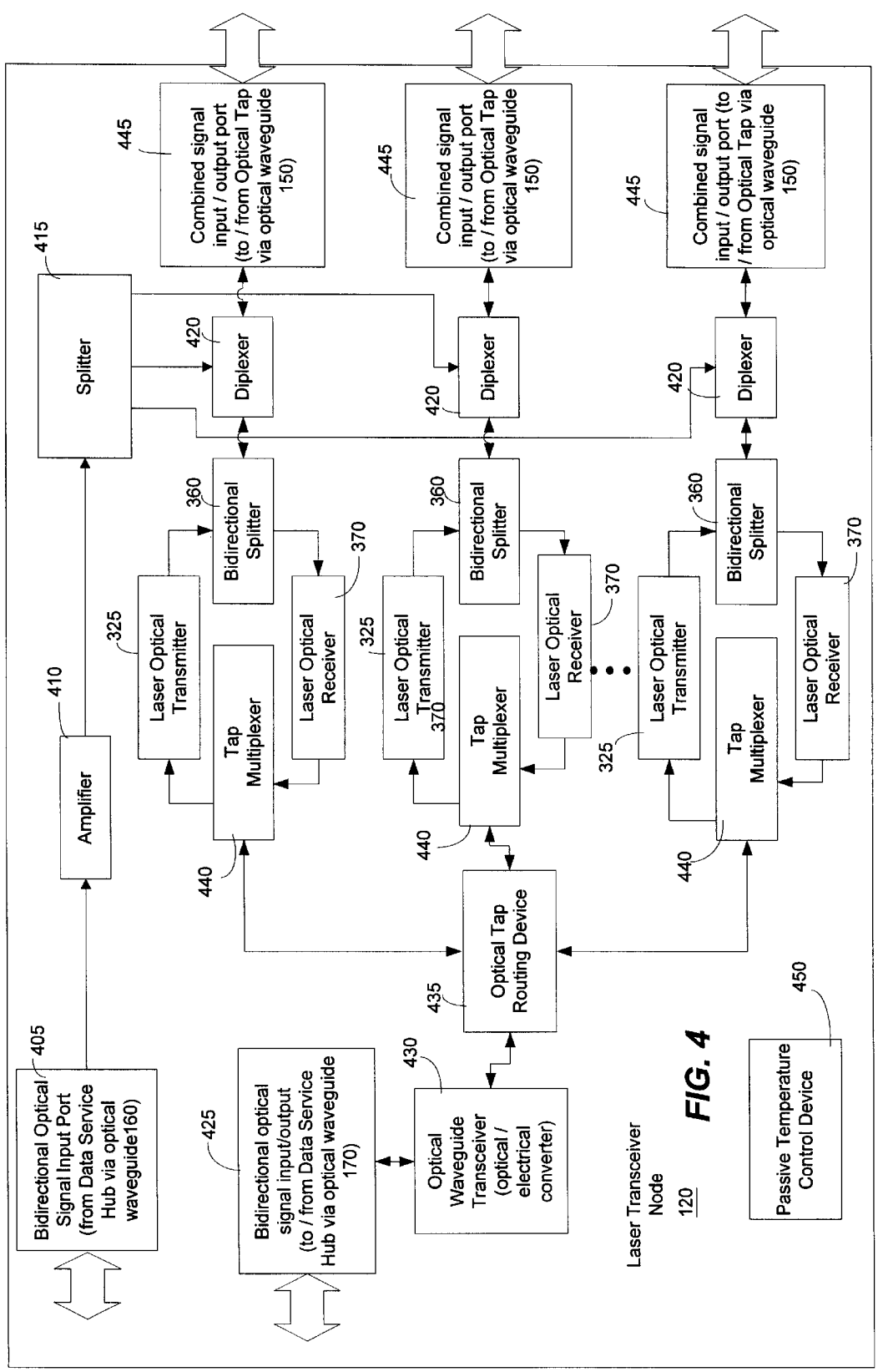
FIG. 4 is a functional block diagram illustrating an exemplary outdoor laser transceiver node according to the present invention.

Referring now to FIG. 4, this Figure illustrates a functional block diagram of an exemplary outdoor laser transceiver node 120 of the present invention. In this exemplary embodiment, the laser transceiver node 120 can comprise a optical signal input port 405 that can receive optical signals propagated from the data service hub 110 that are propagated along a first optical waveguide 160. The optical signals received at the optical signal input port 405 can comprise broadcast video data. The optical signals received at the input port 405 are propagated to an amplifier 410 such as an Erbium Doped Fiber Amplifier (EDFA) in which the optical signals are amplified. The amplified optical signals are then propagated to a splitter 415 that divides the broadcast video optical signals among diplexers 420 that are designed to forward optical signals to predetermined groups of subscribers.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets as they arrive, by each tap multiplexer 440. The optical tap routing device is connected to each tap multiplexer 440 to receive these upstream data packets. The optical tap routing device 435 relays the packets to the data service hub 110 via the optical waveguide transceiver 430. The optical tap routing device 435 can build a lookup table from these upstream data packets coming to it from all tap multiplexers 440 (or ports), by reading the source IP address of each packet, and associating it with the tap multiplexer 440 through which it came. This lookup table can then be used to route packets in the downstream path. As each packet comes in from the optical waveguide transceiver 430, the optical tap routing device looks at the destination IP address (which is the same as the source IP address for the upstream packets). From the lookup table the optical tap routing device can determine which port is connected to that IP address, so it sends the packet to that port. This can be described as a normal layer 3 router function as is understood by those skilled in the art.

The optical tap routing device 435 can assign multiple subscribers to a signal port. More specifically, the optical tap routing device 435 can service groups of subscribers with corresponding respective signal ports. The optical taps 130 logically coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexer 440 is to receive a downstream electrical signal, or identify which of a plurality of optical taps 130 propagated an upstream optical signal (that is converted to an electrical signal). The optical tap routing device 435 can format data and implement the exemplary protocol required to send and receive data from each individual subscriber connected to a respective optical tap 130. The exemplary protocol can comprise Gigabit Ethernet having a predetermined coding scheme of 8B/10B encoding and a downstream timing scheme of time division multiplexing and an upstream timing scheme of time division multiple access (TDMA). The optical tap routing device 435 can comprise a computer or a hardwired apparatus that executes a program defining a protocol and the predetermined timing scheme for communications with groups of subscribers assigned to individual ports.

Exemplary embodiments of programs defining the protocol and predetermined timing scheme are discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The signal ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). Other laser technologies may be used within the scope of the invention. The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical transmitter 325. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/ output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120.

Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both. The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
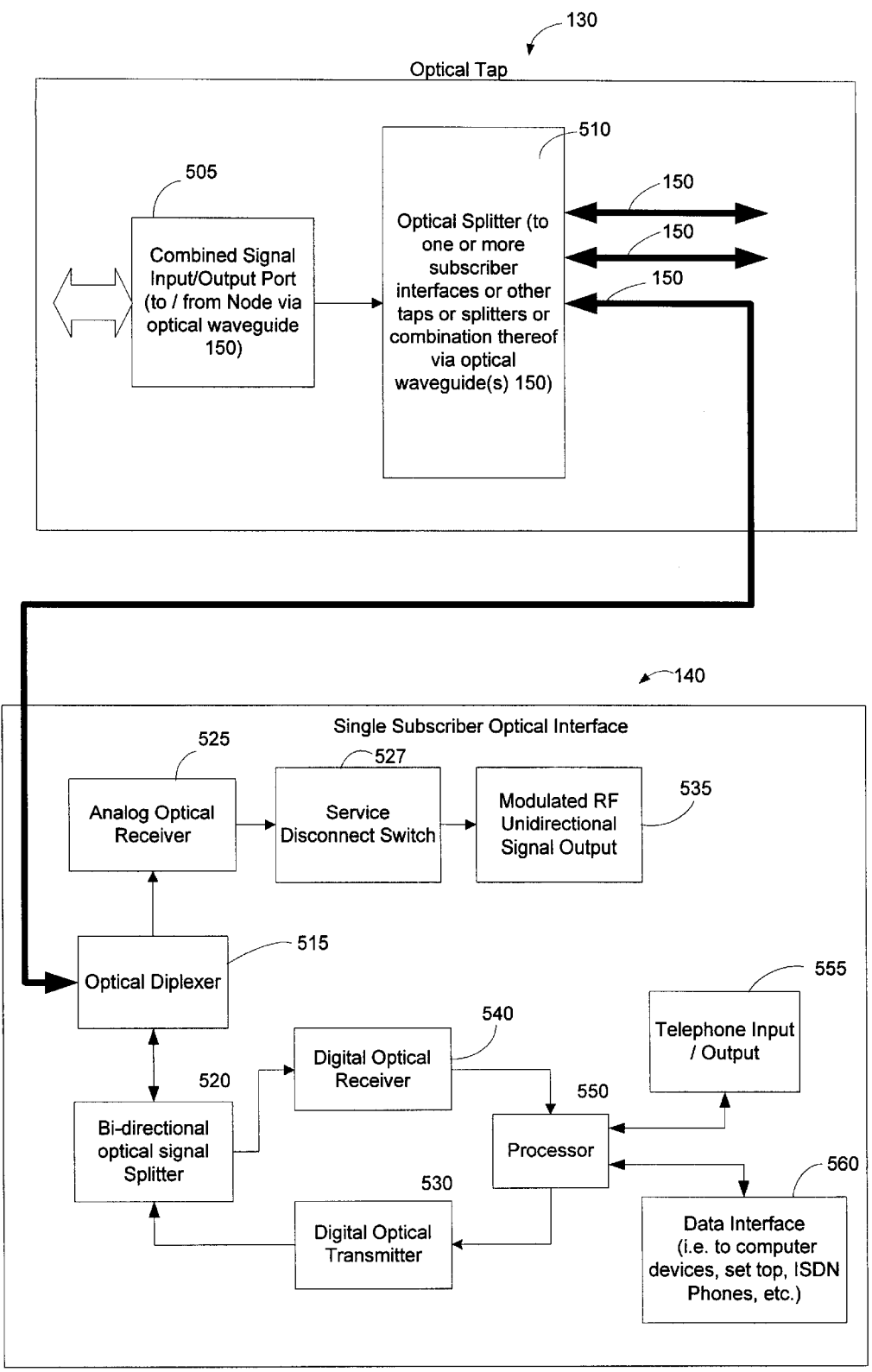
FIG. 5 is a functional block diagram illustrating an optical tap connected to a subscriber interface by a single optical waveguide according to one exemplary embodiment of the present invention.

Referring now to FIG. 5, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port 505 that is connected to another distribution optical waveguide that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention. The optical tap can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided.

However, those skilled in the art will appreciate that the optical tap 130 can be incorporated within the laser transceiver node 120.

The subscriber optical interface 140 functions to convert downstream optical signals received from the optical tap 130 into the electrical domain that can be processed with appropriate communication devices. The subscriber optical interface 140 further functions to convert upstream electrical signals into upstream optical signals that can be propagated along a distribution optical waveguide 150 to the optical tap 130. The subscriber optical interface 140 can comprise an optical diplexer 515 that divides the downstream optical signals received from the distribution optical waveguide 150 between a bi-directional optical signal splitter 520 and an analog optical receiver 525. A service disconnect switch 527 can be positioned between the analog optical receiver 525 and modulated RF unidirectional signal output 535.

The optical diplexer 515 can receive upstream optical signals generated by a digital optical transmitter 530. The digital optical transmitter 530 converts electrical binary/digital signals to optical form so that the optical signals can be transmitted back to the data service hub 110. Conversely, the digital optical receiver 540 converts optical signals into electrical binary/digital signals so that the electrical signals can be handled by processor 550.

The analog optical receiver 525 can convert the downstream broadcast optical video signals into modulated RF television signals that are propagated out of the modulated RF unidirectional signal output 535. The modulated RF unidirectional signal output 535 can feed to RF receivers such as television sets (not shown) or radios (not shown). The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream electrical signals into the optical domain.

The digital optical receiver 540 can comprise one or more photoreceptors or photodiodes that convert optical signals into the electrical domain. The digital optical transmitter can comprise one or more lasers such as the Fabry-Perot (F-P) Lasers, distributed feedback lasers, and Vertical Cavity Surface Emitting Lasers (VCSELs).

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 555 that can comprise an analog interface.

The processor 550 is also connected to a data interface 560 that can provide a link to computer devices, set top boxes, ISDN phones, and other like devices. Alternatively, the data interface 560 can comprise an interface to a Voice over Internet Protocol (VoIP) telephone or Ethernet telephone. The data interface 560 can comprise one of Ethernet's (10BaseT, 100BaseT, Gigabit) interface, HPNA interface, a universal serial bus (USB) an IEEE1394 interface, an ADSL interface, and other like interfaces.

Figure 6:
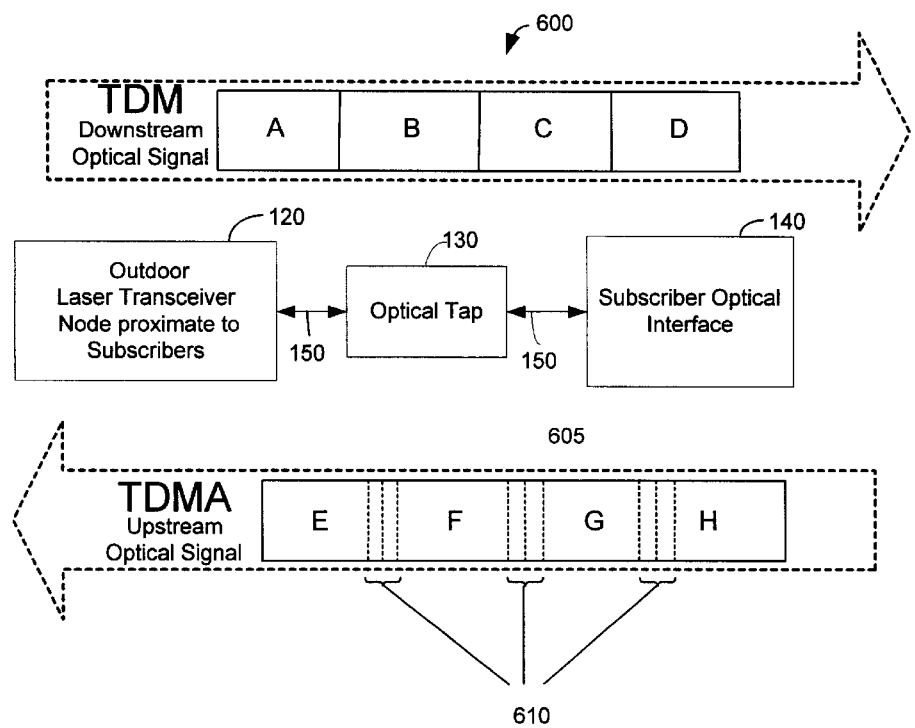
FIG. 6 is a functional block diagram illustrating upstream and downstream communications in their respective timing schemes between the laser transceiver node and the subscriber optical interface according to an exemplary embodiment of the present invention.

Upstream and Downstream Optical Communications with Predetermined Timing Schemes Referring now to FIG. 6, this figure illustrates exemplary timing schemes for downstream and upstream optical communications between the laser transceiver node 120 and the subscriber optical interface 140 according to one exemplary embodiment of the present invention. For downstream communications, the outdoor laser transceiver node 120 can transmit data according to a time division multiplexing (TDM) scheme for data segments A, B, C, and D that are sent serially one after another. Opposite to the downstream optical communication 600, the subscriber optical interface 140 generates upstream optical communications 605 that can comprise data segments E, F, G, and H that are not transmitted immediately one after another because of transition time intervals 610 that are interposed between each of the data segments E, F, G, and H.

Without the present invention, conventional hardware and software that produce an upstream optical signal utilizing a predetermined timing scheme such as TDMA has transition time intervals 610 that are fairly large and detract from the efficiency at which data is communicated from subscriber optical interfaces to a data service hub. However, with the present invention, the transition time intervals 610 can be substantially reduced such that upstream optical communications from subscriber optical interfaces 140 to data service hubs 110 are optimized.

Figure 7:
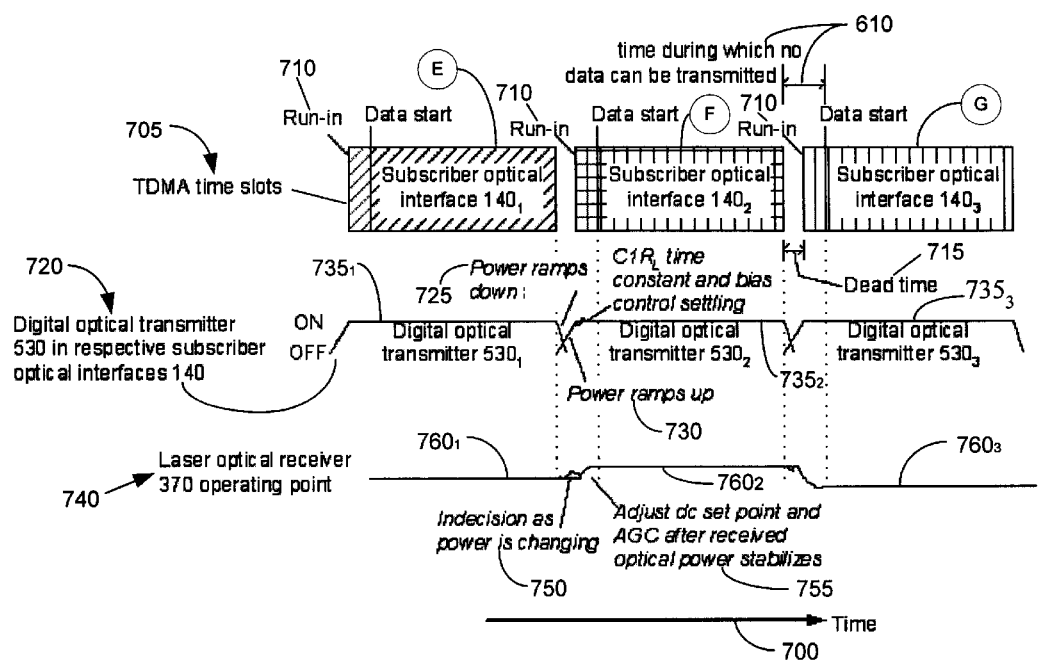
FIG. 7 is a functional block diagram illustrating an exemplary predetermined timing scheme for upstream communications according to one exemplary embodiment of the present invention.

Referring now to FIG. 7, this figure is a functional block diagram that describes how the transition time intervals 610 are created. The transition time intervals 610 are produced when a first digital optical transmitter $530_1$ powers down after sending its data E and when a second digital optical transmitter $530_2$ starts to power up its optical transmitter for transmitting its data F. In the timing scheme diagram of FIG. 7, time 700 is advancing to the right. For the purposes of illustration, only three digital optical transmitters 530 of three subscriber optical interfaces 140 are illustrated, although those skilled in the art recognize that additional subscriber optical interfaces 140 with respective digital optical transmitters 530 can be employed without departing from the scope and spirit of the present invention.

The top region 705 of the diagram illustrates exemplary TDMA time slots in which one subscriber optical interface 140 after another is authorized to transmit data in an upstream direction. Digital optical transmitters $530_1$, $530_2$, and $530_3$ are located in respective subscriber optical interfaces $140_1$, $140_2$, and $140_3$. At the beginning of the transmit time for each subscriber optical interface 140, a run-in sequence 710 is transmitted. This sequence 710 is a known data pattern usually transmitted to allow the circuits described below to settle to the correct operating point, and which will allow a clock and optical receiver 370 to lock on to incoming data. In other words, the transition time interval 610 can comprise this run-in sequence 710 where no readable data is transmitted until the conclusion of the run-in sequence 710. In addition to the run-in sequence 710, the transition time interval 610 can further comprise dead time between each respective data segment E, F, G. The dead time 715 is necessary in some instances to compensate for clock inaccuracies and time ambiguities in the turn-on and turnoff of each digital optical transmitter 530.

The second row 720 of FIG. 7 illustrates the state of each digital optical transmitter during a time its respective subscriber optical interface 140 is authorized to send data during the predetermined timing scheme of TDMA. The second row 720 of FIG. 7 can ideally comprise two states: up, meaning the transmitter 530 is transmitting at normal power, and down, meaning the digital optical transmitter 530 is not transmitting. However, in reality, each digital optical transmitter 530 requires to time to power up to the maximum amount of power when it is turned on. And similarly, each digital optical transmitter 530 requires some time to reduce its power to zero when it is turned off.

The power ramp down period 725 of the first digital optical transmitter $530_1$ can overlap the power ramp-up period 730 for the second digital optical transmitter $530_2$. In other words, while first transmitter $530_1$ is reducing its power, the second optical transmitter $530_2$ is turning on and increasing its power level as indicated in the power ramp-up period 730. When the power for a respective digital optical transmitter 530 reaches its maximum, the circuits responsible for generating this power will settle to their respective quiescent states 735 illustrated with a flat, nonsloping line segment.

The third row 740 of FIG. 7 illustrates the upstream optical signal 605 from the vantage point of a single optical receiver 370 of a laser transceiver node 120. The transition time interval 610 for the optical receiver 370 can comprise two components. A first component of the transition time interval 610 can comprise an adjustment of an automatic gain control (AGC) operating point. Signals from each digital optical transmitter 530 can arrive at the optical receiver 370 at slightly different power levels. This variation in power levels can be attributed to normal production variations of the components producing the upstream optical energy and the output power of the transmitters 530 as well as varying losses between each transmitter 530 and the optical receiver 370.

Because of different power levels, many optical receivers 370 employ AGC circuits similar in concept to those found in RF radio receivers. AGC circuits can adjust the gain of an amplifier such that the output signal level is suitable for application for a next stage of processing regardless of the varying level of input optical power.

When switching the receiving of data from one transmitter 530 to another, an AGC circuit usually needs some time to readjust its operating level. This readjustment time forms part of the transition time interval 610 for the optical receiver 370 and can occur during run-in time 710. Further, an AC coupling stage can occur in each optical receiver 370. This AC coupling stage can shift the incoming operating power point from one optical transmitter 530 to another. This AC coupling stage also forms a portion of the transition time interval 610 as perceived by the optical receiver 370.

Graph 740 of FIG. 7 illustrates uploading power points of a single optical receiver 370 that receives signals from various digital optical transmitters 530. Graph 740 is intended to illustrate a composite picture of the automatic gain control adjustment and AC coupling that occurs during the transition time interval 610 when there is a switch between data generated by one optical transmitter 530 to another. The transmission time interval 610 for graph 740 further comprises an indecision time 750 that can occur when the received power from a first transmitter $530_1$ is turning off while the power from another second transmitter $530_2$ is turning on. The operating point during indecision time 750 can fluctuate or is inconsistent since the typically both transmitters $530_1$, $530_2$ are in a state of transition.

After the first transmitter $530_1$ has turned off and the second optical transmitter $530_2$ has stabilized its output, then the optical receiver 370 can still require some time 755 to settle the AC coupling and the automatic gain control. Further, it is noted that the flat or quiescent portions 760 of the graph 740 do not comprise the same amplitude of power level for each of the subscriber optical interfaces 140. This difference in power level between respective subscriber optical interfaces 140 is a result of the difference in the received power level from each of the three optical transmitters 530.

The adjustment period 755 can occur during the same time that the run-in signals 710 are being transmitted to the optical receiver 370. The run-in signals 710 can be very important to allow an optical receiver 370 to arrive at its correct quiescent state. Each run-in signal 710 is also necessary to allow a respective transmitter 530 to reset itself to a correct operating level.

While all the various setting issues identified above are described somewhat serially in FIG. 7, in practice all of the settling events at the optical transmitter 530 and at the optical receiver 370 usually occur simultaneously. One exemplary aspect of the present invention is to force or drive all of the settling events illustrated in FIG. 7 to happen faster such that the transition time interval 610 is substantially reduced or eliminated. It is noted that during each transition time interval 610, no data can be transmitted between a respective subscriber optical interface 140 and the laser transceiver node 120. In the conventional art, when transition time intervals in a predetermined timing scheme such as TDMA become large, then the transition time interval 610 can seriously limit the ability and efficiency of the optical communication system to transfer data between the subscriber optical interface and the data service hub 110.

Low Occupied Frequency Data Discovery

Figure 8:
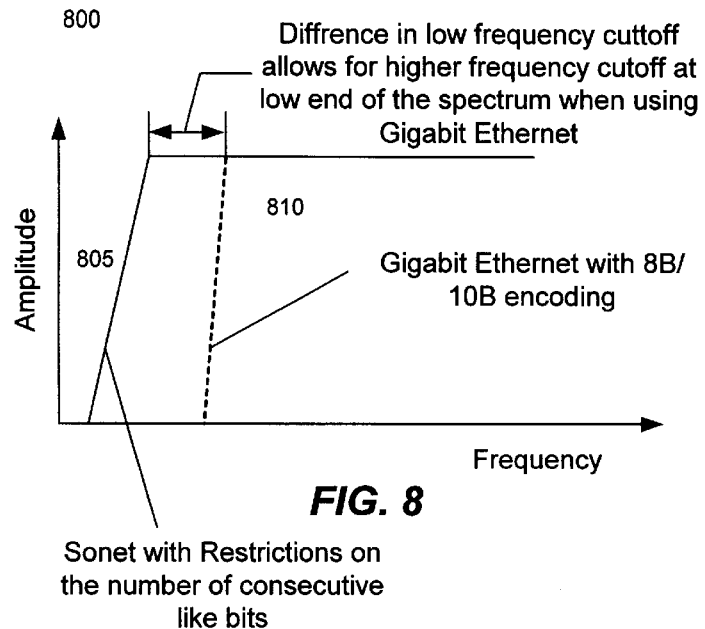
FIG. 8 is a graph illustrating the amplitude versus the frequency of data prorogated according to conventional optical protocols and an exemplary optical protocol according to the present invention.

Referring now to FIG. 8, the graph 800 illustrates the occupied frequency of data that is formatted according to conventional optical network protocols such as SONET compared to data that is formatted to an exemplary network protocol encoded with a predetermined coding scheme according to the present invention. As noted above this diagram illustrates a frequency spectrum of conventional network protocols, as well as the exemplary network protocol according to the present invention.

The inventors have discovered that data formatted according to an exemplary network protocol with a predetermined coding scheme according to the present invention does not extend to as low as an occupied frequency as does the data formatted with the conventional optical network protocol such as SONET. Specifically, the first solid slanted line 805 represents data that is formatted according to conventional optical network protocols such as SONET.

At the exemplary speed of half gigabit per second data rate, the minimum frequency of a SONET signal is approximately lower than 4.3 MHz, and for Ethernet with 8B/10B encoding, is approximately 52 MHz. Suitable time constants for SONET signals at this data rate are approximately a minimum of 184 nanoseconds, and for Gigabit Ethernet are approximately 15 nanoseconds. Both are based on a time constant corresponding to approximately five times the minimum occupied frequency.

It is noted that in the exemplary system, 8B/10B encoding specified for Gigabit Ethernet is used, though the actual data rate is one half Gigabit before 8B/10B encoding, or 625 Mb/s after 8B/10B encoding. This is understood by those skilled in the art. Thus, when reference is made in this description to Gigabit Ethernet, it is understood to those of ordinary skill in the art that the exemplary embodiment can operate at one half this rate using the same 8B/10B encoding, though other rates are certainly possible and within the scope and spirit of the present invention.

Meanwhile, the dashed slanted line 810 represents the starting and lowest frequency for data formatted according to a network protocol encoded with a predetermined coding scheme. According to one exemplary aspect of the present invention, the inventors of the present application have discovered that the network protocol comprising Gigabit Ethernet having a predetermined encoding scheme such as 8B/10B encoding does not extend to as low an occupied frequency as that of data formatted according to conventional optical network protocols such as SONET.

Since the occupied frequency of the network optical protocol of the present invention does not extend to as low a frequency as does the conventional optical network protocol, the present invention can take advantage of such a property so that the time constant of high frequency circuits that handle data according to these formats can be optimized such that an increase in speed at which the high frequency circuits can transition from one subscriber optical interface to another substantially improves the efficiency and operation of upstream data communications with a data service hub 110.

The inventors have identified a few factors that can account for how quickly an optical data system can transition from one digital optical transmitter 530 to another. These factors can include:

(1) The speed at which a transmitter 530 completing its transmission can turn off; (2) the speed at which a transmitter 530 can turn on; and (3) the speed at which a transmitter 530 commencing its transmission can settle certain internal coupling parameters so that it is transmitting valid and perceptible data via the laser transceiver node 120 to the data service hub 110; and (4) the speed at which the optical receiver 370 can recover from receiving signals from one transmitter 530 to the next; setting its base line automatic gain control signal, and the AC coupling to be correct for the commencing or initiating transmitter 530.

Figure 9:
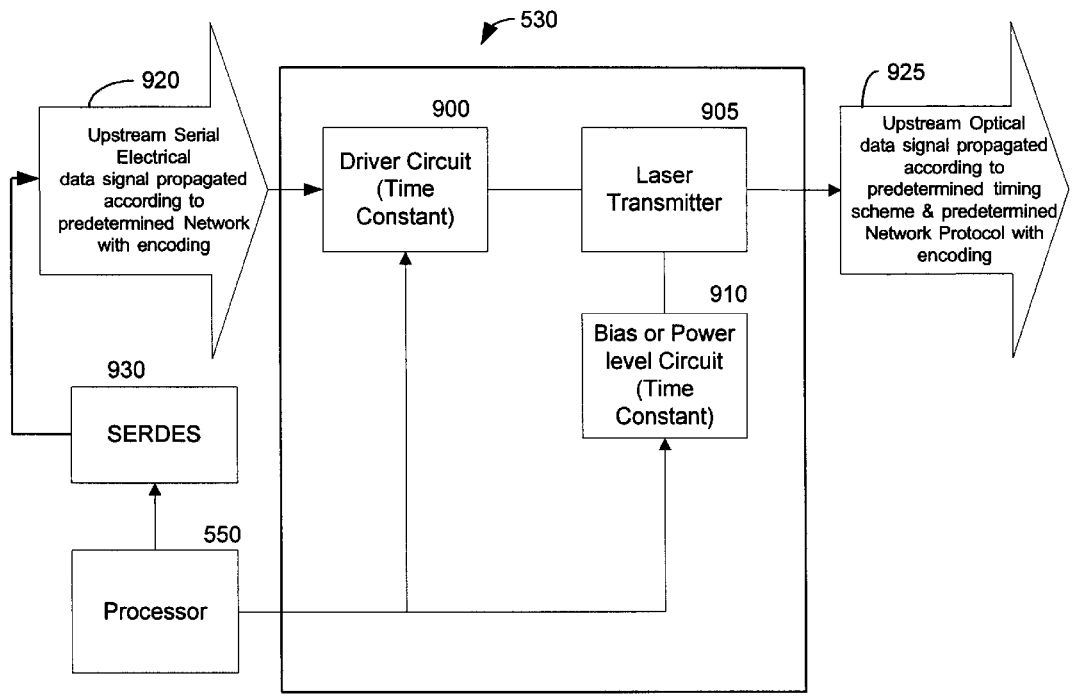
FIG. 9 is a functional block diagram of some core components of a digital optical transmitter according to one exemplary embodiment of the present invention.

Exemplary Optical Transmitter Adjusted to Data Frequency of Predetermined Protocol Referring now to FIG. 9, this Figure illustrates a functional block diagram of the digital optical transmitter 530 positioned within the subscriber optical interface 140. The digital optical transmitter 530 can comprise a driver circuit 900, a laser transmitter circuit 905, a power level circuit 910, and optional voltage forcing circuit 915. The driver circuit 900 can receive serial electrical data 920 from a serial/de-serializer (SERDES) 930. SERDES 930 receives parallel data from the processor 550 and converts the data to a serial format. Both the serial data and parallel data are propagated according to a network protocol at one-half a Gigabit per second or faster with a predetermined encoding scheme. Further details of the driver circuit 900 will be described below with respect to FIG. 10.

The serial data output from the driver circuit 900 modulates the laser transmitter 905. The laser transmitter 905 can comprise a laser diode. However, other types of laser transmitters 905 are not beyond the scope of the present invention. Other types of laser transmitters 905, include, but are not limited to, Fabry-Perot (F-P) Laser Transmitters, distributed feedback lasers (DFBs), or Vertical Cavity Surface Emitting Lasers (VCSELs). It is also possible to use emitters that emit signals over a wider range of wavelengths, such as light emitting diodes.

The bias or power level circuit 910 produces the electrical current needed to power the laser transmitter 905. Both the power level circuit 910 and the driver circuit 900 are controlled by the processor 550. The processor 550 activates switches that turn on and off for the driver circuit 900 and power level circuit 910. The driver circuit 900 and power level circuit 910 are usually switched on and off at the same times. In other words, the switching positions for each of the switches associated with the respective driver circuit 900 and the power level circuit 910 are turned on and off at the same time by the processor 550.

The processor 550 also forwards parallel data to a serial/de-serializer (SERDES) 930. The SERDES 930 converts the parallel data into serial data which is fed into the driver circuit 900 of the transmitter 530.

Once the laser transmitter 905 is modulated by the driver circuit 900, upstream optical data propagated according to a predetermined time scheme and a network protocol and encoded with a predetermined coding scheme is produced. It is noted that the processor 550 activates the driver circuit 900 and bias and power level circuit 910 at predetermined times according to the predetermined timing scheme.

As noted above, the predetermined timing scheme can comprise time division multiple access (TDMA). However, other predetermined timing schemes such as time division multiplexing (TDM) code division multiple access (CDMA), and other like timing schemes are not beyond the scope and spirit of the present invention when such timing schemes involve switching between a plurality of transmitters 530.

It is noted that the driver circuit 900, the power level circuit 910, and voltage forcing circuit 915 typically comprise ac coupled high frequency electrical circuits that have a coupling time constant that can be adjusted in accordance with the scope and spirit of the present invention.

Figure 10:
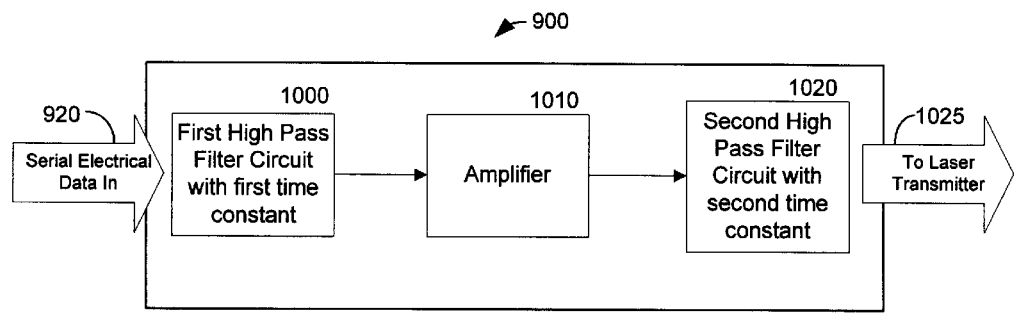
FIG. 10 is a functional block diagram illustrating some exemplary components of a driver circuit of a digital optical transmitter according to one exemplary embodiment of the present invention.

Referring now back to FIG. 10, this Figure is a functional block diagram illustrating some discrete components of an exemplary driver circuit 900. The exemplary driver circuit 900 can comprise a first high pass filter circuit 1000 having a first time constant. The driver circuit 900 can further comprise an amplifier 1010 and second high pass filter circuit 1020 having a second time constant. The first high pass filter circuit 1000 can receive the electrical data 920. The electrical data 920 then flows through the amplifier 1010 and through the second high pass filter circuit 1020. The second high pass filter circuit 1020 produces data in accordance with a second time constant.

The second high pass filter circuit 1020 forwards the filtered data to the laser transmitter diode 905. Further details of the first high pass filter circuit 1000, amplifier 1010, and second high pass filter circuit 1020 will be discussed below with respect to FIG. 11. The present invention is not limited to the number and types of filters and amplifiers 1010 illustrated. The driver circuit 900 can comprise any number of different electrical circuits that are designed to modulate laser transmitter diodes 905. According to the present invention, the time constant of the first high pass filter circuit 1000 and the time constant of the second high pass filter circuit 1020 can be adjusted.

Figure 11:
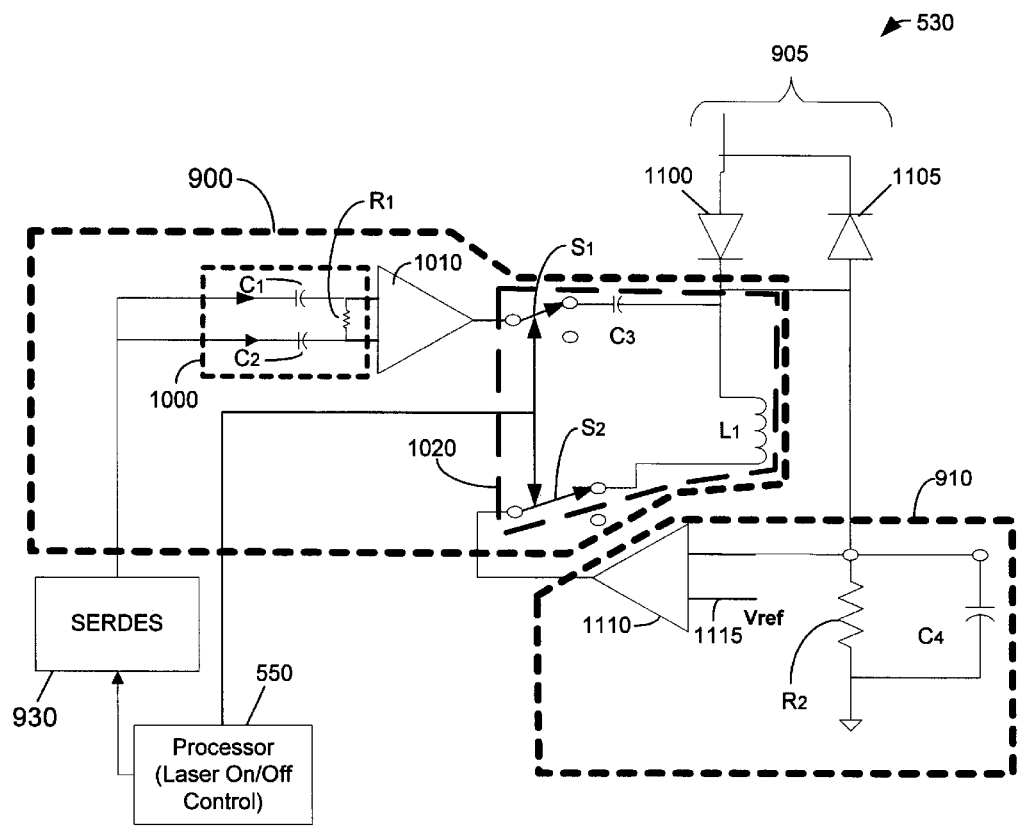
FIG. 11 is an electrical circuit diagram of an exemplary digital optical transmitter according to one exemplary embodiment of the present invention.

Referring now to FIG. 11, this Figure illustrates one exemplary electrical circuit for the digital optical transmitter 530. The digital optical transmitter 530 can comprise the driver circuit 900, laser transmitter circuit 905, power level circuit 910, and an optional voltage forcing circuit 915. The driver circuit 900 in one exemplary embodiment comprises a first high pass filter circuit 1000 with a first time constant, an amplifier 1010, and a second high pass filter circuit 1020 with a second time constant.

The first high pass filter circuit 1000 can comprise two capacitors C1, C2 that can couple opposite phases of a balanced signal, as is understood by those skilled in the art. The first high pass filter circuit 1000 may further comprise a terminating Resistor $R_1$ The amplifier 1010 can convert the incoming data from balanced to unbalanced, and set the current to what is needed to effect proper modulating current in an exemplary laser diode 1100. The data amplifier 1010 can comprise an operational amplifier 1010 whose output can be routed through switch S1.

Switch S1 can interrupt data when the digital optical transmitter 530 is switched off by the processor 550. From switch S1, data can be capacitively coupled through third capacitor C3 to cathode of the exemplary laser diode 1100. The capacitive coupling of the third capacitor C3 can remove any DC off-set, and also permitting the power level loop 910 to control the average power output of laser diode 1100. The third capacitor C3 forms a portion of the second high pass filter circuit 1020 having a second time constant.

The second high pass filter circuit 1020 further comprises a first inductor L1 and a second switch S2. The second high pass filter circuit 1020 has a second time constant that is a function of the third capacitor C3, and the first inductor L1. The second time constant can also be a function of any equivalent resistance that may be generated by the wires, the resistance of laser diode 1100, and other like components that may produce some form of resistance. Switch S1 and the second switch S2 operate in parallel with one another meaning that when the first switch S1 is "on," the second switch S2 is also turned "on." The first and second switches S1, S2 are controlled by the processor 550.

The first inductor L1 can isolate the power leveling circuit 910 from the data introduced to the laser diode 1100 where the third capacitor C3 feeds the data into the diode 1100. The first inductor L1 usually comprises a high impedance at all frequencies at which any data signal power exists. This can include the lowest frequencies of the data signal, where the highest inductance is usually demanded of the first inductor L1. Those skilled in the art will appreciate that the second high pass filter circuit 1020 can comprise different circuit elements than those illustrated in FIG. 11, without departing from the scope and spirit of the present invention.

The optical transmitter 905 can further comprise a monitor diode 1105 that receives optical power from the laser diode and can produce a current proportional to the light level of the diode 1100. This current can be converted to a voltage in a second resistor $R_2$ of the power level circuit 910. The voltage in the second resistor $R_2$ of the power level circuit 910 can be averaged by a fourth capacitor C4.

The power level circuit 910 further comprises a second amplifier 1110 that generates any necessary voltage to correct the current flowing through diode 1100 and through the first inductor L1. This current flowing through the diode 1100 is a result of the voltage produced by a second amplifier 1110 produces the desired average output light level of diode 1100. The power level circuit 910 has a third time constant relative to the entire optical transmitter that is a function of the fourth capacitor C4 and the second resistor R2. The fourth capacitor C4 may be considered as a low pass filter of the power level circuit 910.

The power leveling circuit 910 forces the averaged value of the optical power produced by the diode 1100 to be at the desired power level, which desired power representation is supplied to the second amplifier 1110 first input 1115. This desired voltage is represented by the notation "$V_{REF}$" illustrated in FIG. 11. The power level circuit 910 is not limited to the circuit elements illustrated in FIG. 11. Other circuit elements for the power level circuit 910 are not beyond the scope and spirit of the present invention.

It is noted that additional compensating circuit components can be employed without departing from the scope and spirit of the present invention. FIG. 11 illustrates enough circuit elements to demonstrate at least one aspect of the present invention. Those skilled in the art will appreciate that additional circuit elements may be required to build a functional circuit.

The operation of the driver circuit, the laser transmitter circuit 905, and the power level circuit 910 are described as follows: the first switch S1 is closed in order to start signal current flowing through the laser diode 1100, which will start producing some optical power. Some lag or delay will exist to start producing this optical power as a result of the operation of the second time constant, involving C3.

The inductance of the first inductor L1 is needed in order to provide direct current (DC) in the diode 1100. The first inductor L1 can also prevent any bias signal from being propagated to the second amplifier 1110. Those skilled in the art recognize that some time is needed for current to start flowing through the first inductor L1 when the diode 1100 is turned on.

Time is also needed to build up the proper charge on the fourth capacitor C4 of the power leveling circuit 910. While the time needed by the above identified circuit elements to achieve their proper operating level may be measured in microseconds, any number of microseconds can have a substantial impact when transferring data according to predetermined timing schemes such as time division multiple access (TDMA) and at data transfer rates such as one half Gigabit per second.

When the second switch S2 is closed to activate or connect the power level circuit 910 to the driver circuit 900 and laser transmitter circuit 905, laser diode 1100 turns on. A direct current (DC) component is supplied by monitor diode 1105 to charge the fourth capacitor C4. The DC current flowing across the fourth capacitor C4 of the power level circuit 910 may also take some time to charge C4, that can be measured in microseconds. According to one exemplary aspect of the present invention, the time needed to establish charges across capacitors and currents through inductors of the aforementioned circuits are minimized.

The time required to charge each of the capacitors of the various circuits of the optical transmitter 530 is dependent on the time constants of each of their respective circuits. For example, the time required to charge the fourth capacitor C4 to its operating voltage is proportional to the value of the capacitance of the fourth capacitor C4 and the value of resistance for the second resistor R2. The time for the third capacitor C3 of the driver circuit 900 is a function of the third capacitor's C3 capacitance, any equivalent resistance within the lines connected to the third capacitor C3, and the inductance of the first inductor L1.

According to one aspect of the present invention, it has been determined that the value of each of the capacitors of each of the individual circuits discussed above can be adjusted to change the time constants of the respective circuits in order to propagate data formatted according to a predetermined network protocol encoded with the predetermined coding scheme, and according to a predetermined timing scheme. In other words, according to one exemplary aspect of the invention, it has been discovered that the time constants of the circuits discussed above can be customized or adjusted for data that is formatted according to a predetermined network protocol that is encoded with a predetermined coding scheme.

Specifically, the predetermined network protocol can comprise half Gigabit or faster Ethernet encoded with 8B/10B encoding and transmitted according to time division multiple access (TDMA). Those skilled in the art recognize that a significant portion of optical equipment on the market as of the filing date of this specification is designed to operate with a SONET standard optical network protocol.

Because this hardware is designed for this specific optical network protocol, the hardware cannot optimally process data that is formatted with the predetermined network protocol, the predetermined encoding scheme that is transmitted according to a predetermined timing scheme such as time division multiple access (TDMA) of the present invention. Adjusting the time constants of the electrical circuits of the present invention is limited to a range because of the frequency of the data formatted according to the predetermined network protocol and because of the type of encoding used.

Referring briefly back to FIG. 8 as noted above, this diagram illustrates a frequency spectrum of conventional network protocols, as well as the exemplary network protocol according to the present invention. The inventors have discovered that the network protocol according to the present invention has a higher minimum occupied frequency, relative to the minimum occupied frequency of conventional network protocols such as SONET.

Dashed line 810 illustrates the lowest frequency that can be occupied by the network protocol of the present invention as well as the predetermined coding scheme. The inventors have discovered that Gigabit Ethernet protocol with 8B/10B encoding has a different lowest frequency relative the lowest frequency of a conventional network protocol such as SONET. The time constants of the present invention are adjusted to quickly achieve this lowest frequency of the network protocol of the present invention, which can comprise Gigabit Ethernet with 8B/10B encoding.

Specifically, the time constant for the electrical circuits of the present invention is adjusted to make sure that the electrical circuits have small enough time constants such that they do not track data at the lowest occupied frequency of the data. Otherwise, these electrical circuits could try to remove the low frequency components in the data. In other words, distortion could be introduced into the data signal, which would make it difficult to recover any data from the signal.

The data frequency discussed in this specification and illustrated in FIG. 8 is defined as follows: when data passes through a high pass filter, the data may comprise a string of ones and zeros. In situations where the data comprises a long sequence of zeroes (0s) or ones (1s), such data achieves the lowest fundamental frequency of the protocol used to format the data. Usually, the longer the string of like data, such as all ones or all zeros, then the lower the data frequency that is needed to be handled by a high pass filter circuit. For example, the conventional network protocol of SONET tests for a maximum number of like characters in a row to comprise 77 bits. More consecutive like bits than this may exist, but this has been taken as a test maximum.

Opposite to the conventional network protocol of SONET, the network protocol of the present invention that is encoded with a predetermined coding scheme, helps limit the number of consecutive ones and zeros between any two code groups of a data string. According to one exemplary embodiment of the present invention, the coding scheme comprises 8B/10B encoding.

8B/10B encoding allows large code spaces which in turn permits a choice of codes with an optimal number of ones and zeros. 8B/10B encoding also limits the number of consecutive ones and zeros between any two code groups. 8B/10B encoding usually provides enough transitions per code group to facilitate clock recovery. 8B/10B encoding also allows the use of special code words.

Specifically, every ten bit code group must fit into one of the following three possibilities: (1) five ones and five zeros; (2) four ones and six zeros; and (3) six ones and four zeros.

8B/10B encoding also includes the running disparity to help maintain DC balance and to provide additional error checking. The running disparity is understood by those skilled in the art. But as a review of this concept, by using the predetermined coding scheme of the present invention such as 8B/10B encoding, direct current (DC) balancing can be achieved through the use of the running disparity. Running disparity is designed to keep the number of ones transmitted by a transmitter 530 substantially equal to the number of zeros transmitted by that transmitter 530. This should keep the DC level balance halfway between the "one" voltage level "zero".

Running disparity can take on one of two values: positive or negative. In the absence of errors, the running disparity value is positive if more ones have been transmitted than zeros, and the running disparity value is negative if more zeros have been transmitted than ones since power-on or reset. The 8B/10B encoding scheme is designed to provide a high transition density which makes synchronization of incoming bit stream easier for the receiver handling the data. More details about the predetermined coding scheme of the present invention that comprises 8B/10B encoding is further described in U.S. Pat. No. 4,665,517 issued on May 12, 1987, to Widmer, the contents of which, are hereby incorporated by reference.

8B/10B encoding also provides that 8 bits of data are encoded to 10 bits of transmitted code. The extra two bits of code can serve a variety of purposes, including differentiating control blocks from data blocks and providing DC balance and transitions for clock recovery. Although 8B/10B codes have previously been described because of popularity of 8 bit bytes, the 8B/10B encoding of the present invention additionally partitions each 8 bit byte into two sub-blocks which are separately encoded. The result is that the 8B/10B is divided into a 3B/4B coding and a 5B/6B coding.

Referring back again to FIG. 10, in light of the exemplary network protocol and its predetermined coding scheme, it is desirable to have the second time constant of the second high pass filter circuit 1020 that comprises the third capacitor C3 and the equivalent resistance of the first inductor L1 to be as low as possible. The equivalent resistance of the second high pass filter circuit 1020 comprises the impedance of the first inductor L1 plus the output impedance of the second amplifier 1110 in parallel with impedance of the laser diode 1100.

Those skilled in the art recognize that this impedance is not a pure resistance, but the impedance may comprise a resistive component and a reactive component, which works with the third capacitor C3 to form the high pass filter circuit 1020. The high pass filter circuit 1020 can filter the data being coupled from the first amplifier 1010 to the diode 1100.

The frequency response of the second high pass filter circuit 1020 is governed by the time constant of the high pass filter circuit 1020 comprising the third capacitor C3 and the equivalent resistance of the components discussed above. As is understood by those skilled in the art, the cut-off frequency (the frequency at which half the power is passed to the third capacitor C3 and half is rejected) is provided by the following equation:

$$f=1/(2\pi\tau)$$

where $\tau=C_3R_L$=time constant

Therefore, it is advantageous to keep the cutoff frequency of the third capacitor C3 and the equivalent resistance of the high pass filter circuit 1020 as high as possible (meaning that the time constant is reduced to as small value as possible) in order to allow the third capacitor C3 to charge to the average value of the data as quickly as possible at the start of a run-in interval 710 as illustrated in FIG. 7. The lower the time constant, the faster the high pass filter circuit 1020 will settle and the faster the data transmission can begin.

The parameter that limits how high the second high pass filter time constant can be low is the lowest frequency of the data signal—the cutoff frequency must be low enough to allow for the signal power to couple through to the first diode 1100. The higher minimum frequency of a Gigabit (or half Gigabit) Ethernet signal with 8B/10B encoding will allow the second high pass filter circuit 1020 to be set lower (where the capacitance value for the third capacitor is reduced). A lower time constant of the second high pass filter will allow it to settle faster.

Another component of the transition time intervals 610 can comprise the power leveling circuit 910. The laser transmitter 905 can settle faster at the beginning of a data transmission if the value of the fourth capacitor C4 is lower. However, the fourth capacitor C4 of the power level circuit 910 must be high enough that low frequency data does not cause the power level circuit 910 to change with the data being transmitted. That is, the power leveling circuit 910 must not change the operating point of the laser diode 1100 as a function of frequency of the data. If the data has higher minimum frequency as shown for the exemplary Gigabit Ethernet with 8B/10B encoding data, then the fourth capacitor C4 may be made smaller so that the power leveling 910 can settle faster at the start of transmission of another subscriber optical interface 120.

The present invention demonstrates that the speed with which the transmitter 530 can start is related to the minimum frequency occupied by the data signal being propagated by transmitter 530. As the minimum frequency is increased, the transmitter may be made to start faster.

Figure 12:
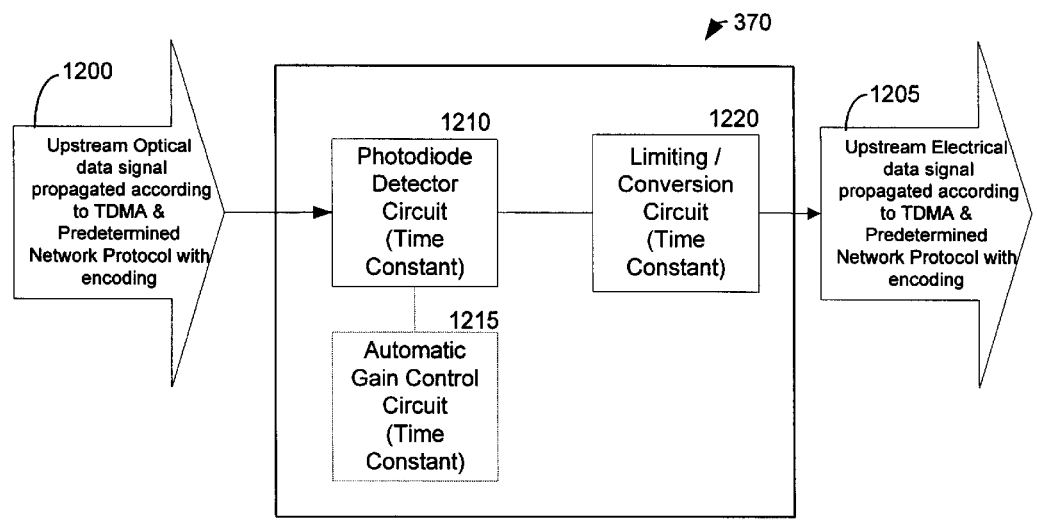
FIG. 12 is a functional block diagram illustrating an exemplary optical receiver according to one exemplary embodiment of the present invention.

Exemplary Optical Receiver Designed for Data Frequency of Predetermined Protocol Referring now to FIG. 12, this Figure illustrates a functional block diagram for an exemplary optical receiver 370 of the present invention. The optical receiver 370 can be designed to receive upstream optical data signals propagated according to a predetermined network protocol and with a predetermined timing scheme and coding scheme. The output of the optical receiver 370 is upstream electrical data signals propagated according to predetermined network protocols, or the predetermined encoding scheme, as well as a predetermined timing scheme.

The optical receiver 370 can comprise an optical detector circuit 1210. The optical receiver 370 may fully comprise an automatic gain control circuit 390 and a limiting/conversion circuit that converts the upstream optical data signal 1200 into an upstream electrical data signal 1205.

Figure 13:
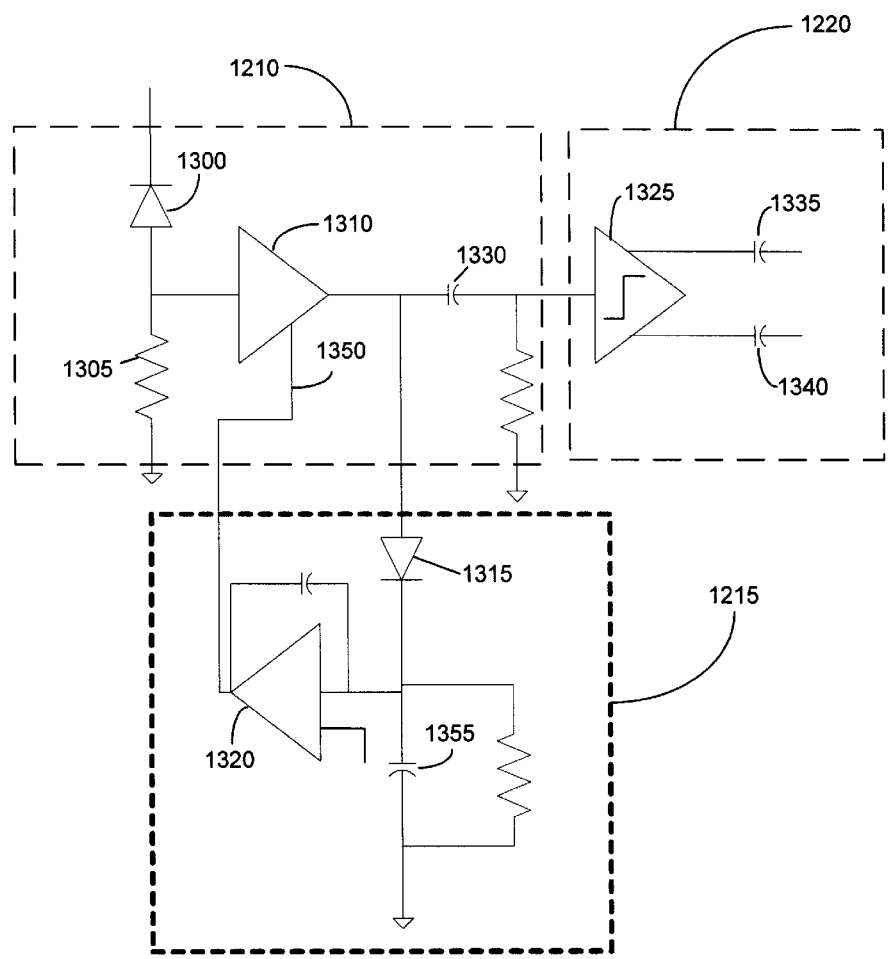
FIG. 13 is an electrical circuit diagram of an exemplary optical receiver according to the present invention.

Referring to FIG. 13, this Figure illustrates exemplary circuit element details corresponding to the function blocks above with respect to the optical detector circuit 1210, the automatic gain control 1215, and the limiting/conversion circuit 1220. The present invention is not limited to the discrete circuit elements illustrated in FIG. 13 for the optical receiver 370. Other different circuit elements or additional circuit elements that are described in each of the circuits described below are not beyond the scope or spirit of the present invention.

The optical detector circuit 1210 can comprise a receiver diode 1300 and a resistor 1305. The optical detector circuit 1210 may further comprise a transimpedance amplifier (TIA). The TIA of the optical detector circuit 1210 comprises a special amplifier that can convert a low impedance signal to a higher impedance signal. The data signal from the transimpedance amplifier 1310 can be capacitively coupled via the first capacitor 1330 to the limiting amplifier 1325 in order to remove any direct current (DC) bias.

A control line 1350 causes the gain of amplifier 1310 to change such that the output of amplifier 1310 is constant regardless of the input level of the optical signal. The control is accomplished by detecting the output level in diode 1315, storing that output level analog on the capacitor 1355 between 1315 cathode and ground. The output level is compared against a reference on the non inverting input of amplifier 1320, and the output level of 1320 is changed until the output level from 1310 is such that the voltage on the capacitor 1355 is equal to the reference voltage on the non-inverting input.

The optical detector circuit may also include an automatic gain control circuit 1215 may further comprise the buffer amplifier 1320 that compares the received voltage with a reference that represents a voltage being inputted into the linear amplifier 1320. And, if there is a difference between the measured voltage and the voltage supplied, the output of the buffer amplifier 1320 changes and feeds back into the signal amplifier which may comprise a gain control circuit internal to it and its gain depends on the voltage that is coming in on that particular pin. The automatic gain control circuit 1215 may assist the limiting/conversion circuit 1220 to operate at a constant amplitude regardless of variations in the input data signal level, thus increasing the dynamic range of the receiver 370.

The limiting or conversion circuit 1220 may comprise a limiting amplifier 1325. The limiting amplifier 1325 can take a rough or distorted data signal originating out of the optical wave guide and shape it or convert it into a nice set of binary data. The limiting amplifier 1325 of the limiting/conversion circuit 1220 can limit the signal amplitude, converting the analog signal into a digital signal, as well as converting the data signal into balanced data transmission. As known to those skilled in the art, balanced data transmission is a technique of using two wires without a ground to couple a signal from one circuit component to another.

In order to process data quickly, the capacitor 1330 needs to be charged to its average level as soon as possible. However, as noted above, the charging of capacitor 1330 cannot be achieved too quickly, otherwise, the capacitor 1330 may introduce distortion of low frequency components of the data, resulting in errors in data recovery. Therefore, it is desirable to set the capacitance of the capacitors of the optical receiver 370 as low as possible in order to quickly stamp out or eliminate any transients when switching from one transmitter 530 to another. But, the capacitive values should not be so low that they start trying to eliminate some of the data being received by the optical receiver 370.

The limiting or conversion circuit 1220 further comprises a second capacitor 1335 and a third capacitor 1340. These second and third capacitors 1335, 1340 can also be optimized with the present invention by specifically adjusting these capacitors to handle data formatted to a predetermined network protocol, encoded with a predetermined coding scheme, and according to a predetermined timing scheme such as TDMA.

When a new transmitter 530 begins transmitting, and after it has settled to its operating point, the operating point of the optical receiver 370 will need to change as well. This is because the power output of two transmitters 530 can be different, and also because during the transition time during which one transmitter is shutting down and the next transmitter 530 is starting up, the received signal power will be changing, disrupting the quiescent operating point of the receiver 370. Furthermore, it is not always the case that any transmitter was sending data just prior to the time another transmitter 530 switches on.

The voltage across capacitor 1330 will be changing during this transition, and until capacitor 1330 can charge to the voltage required by the operating point of the ON transmitter, the receiver may not put out proper data. As was argued above for the transmitter, if the capacitor 1330—resistor 1345 time constant is shorter, capacitor 1330 can charge faster, and the receiver can put out valid data faster after a new transmitter comes on. A smaller capacitor 1330—resistor 1345 time constant again requires that the lowest frequency occupied by the data, be higher, again working to the good of Gigabit Ethernet with 8B/10B encoding.

In addition, if automatic gain control (AGC) is supplied, those skilled in the art know that the AGC has a time constant associated with it, that is related to the lowest frequency of data. If the AGC time constant can be lowered, the AGC will set itself to the value required by the new signal faster, so again data can be delivered faster.

Figure 14:
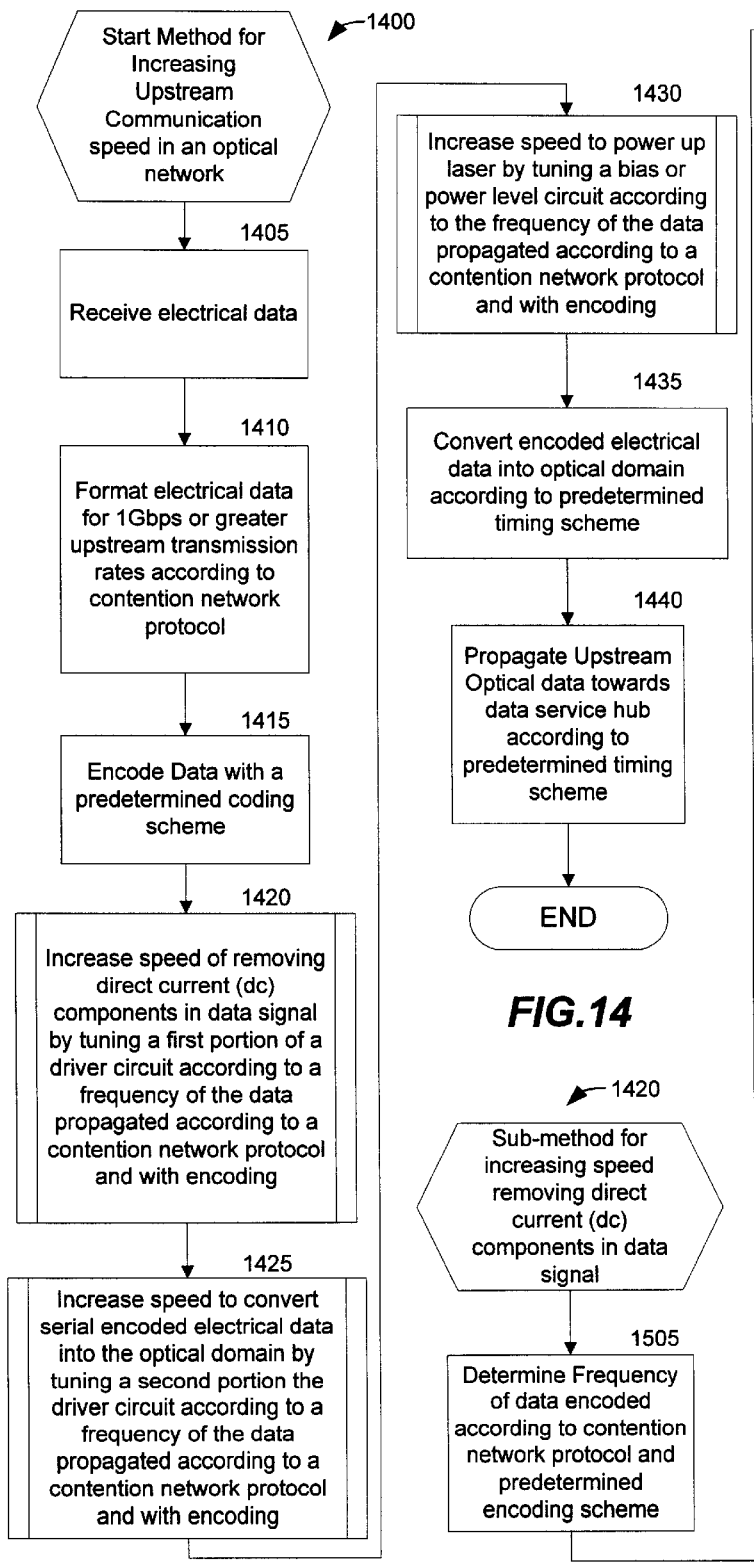
FIG. 14 is a logic flow diagram illustrating an exemplary method for increasing upstream communication speed and optical network from a vantage point of an optical transmitter according to one exemplary embodiment of the present invention.

Exemplary Processes for Increasing Efficiency of Upstream Optical Communications Referring now to FIG. 14, this figure illustrates an exemplary process 1400 for increasing upstream communication speed in an optical network from the vantage point of an optical transmitter. In other words, FIG. 14 illustrates an overview of the steps taken by an optical transmitter according to an exemplary embodiment of the present invention.

The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities.

Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within a computer or discrete hardware elements are often referred to in terms such as creating, adding, calculating, comparing, moving, receiving, determining, identifying, populating, loading, executing, etc. that are often associated with manual operations performed by a human operator.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention. Also, it is recognized that some steps may be combined or performed simultaneously without departing from the scope and spirit of the present invention.

Step 1405 is the first step in the process 1400 for increasing upstream communications speed. In step 1405, electrical data is received by the processor 550 in the subscriber optical interface 140. This electrical data can be generated by any one of a number of sources such as a computer, a telephone, a set top box, a fax machine or any other similar devices, with the signals from analog devices being converted to digital in a suitable circuit such as Telephone input/output 555. The processor 550 in step 1410 formats the electrical data for upstream transmission according to an exemplary network protocol such as Gigabit Ethernet.

Next in step 1415, the processor 550 can further encode the electrical data with a pre-determined coding scheme such as 8B/10B encoding. However, other encoding schemes are not beyond the scope of in spirit of the present invention. Other coding schemes can include, but are not limited to, 16B/18B and 64B/66B encoding.

Next in routine 1420 the speed to remove direct current (dc) components in the serial data signal is increased by adjusting a time constant of a first portion of a driver circuit 900 according to a frequency of the data propagated according to the exemplary network protocol and with the predetermined encoding. Further details of routine 1420 will be discussed below with respect to FIG. 15.

Next in routine 1425, the speed to convert the serial encoded electrical data into the optical domain is increased by adjusting a time constant of a second portion of the driver circuit 900 according to a frequency of the data that is propagated according to the network protocol with the predetermined encoding. Further details of routine 1425 will be discussed below with respect to FIG. 16.

Next, in routine 1430 the speed to power up the laser transmitter 905 is increased by adjusting a time constant of a power level circuit 910 according to the frequency of data propagated according to the network protocol and with a predetermined encoding. Further detail of routine 1430 will be discussed below with respect to FIG. 17.

Subsequently, in step 1435, the encoded electrical data is converted into the optical domain according to a predetermined timing scheme such as time division multiple access (TDMA). Next, in step 1440 the upstream optical data is propagated towards a data service hub 110 according to the predetermined timing scheme of step 1435. The process 1400 is carried out by each subscriber optical interface 140 and in a serial manner meaning that each optical transmitter 530 is powered up or activated according to its time slot in the predetermined timing scheme.

Figure 15:
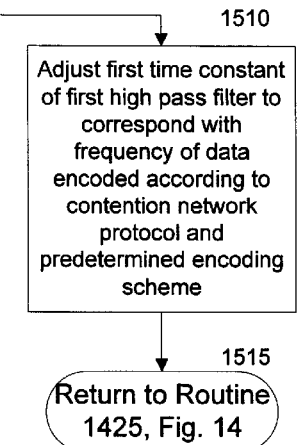
FIG. 15 is a logic flow diagram illustrating an exemplary subprocess for increasing speed to convert electrical data to serial data according to one exemplary embodiment of the present invention.

Referring now to FIG. 15, this figure is a logic flow diagram illustrating an exemplary sub-method for 1420 for increasing speed to remove dc components from the serial data. Step 1505 is the first step in the sub-method 1420 for increasing speed to remove dc components from the serial data. In step 1405, a frequency of the data encoded according to the network protocol and predetermined encoding scheme is determined.

Next, in step 1510 a first time constant of a first high pass filter circuit 1000 is adjusted to correspond with the frequency of the data encoded according to the network protocol and with the predetermined encoding scheme. As noted above, the inventors have discovered that the exemplary network protocol of Gigabit Ethernet with the predetermined encoding scheme of 8B/10B encoding has a lowest occupied frequency that is higher than the lowest occupied frequency of conventional optical network protocols such as SONET.

This means that the time constant of the first high pass filter circuit 1000 can be adjusted by manipulating the capacitance of this particular circuit. However, it is noted that the time constant can be adjusted in other ways if other circuit components are used instead of the ones illustrated in the Figures of the present application. For the discrete circuit components illustrated in the first high pass filter circuit 1000 of the present invention, the time constant can be lowered by reducing the value of the capacitance of this circuit. In step 1515, the process returns to routine 1425 of FIG. 14.

Figure 16:
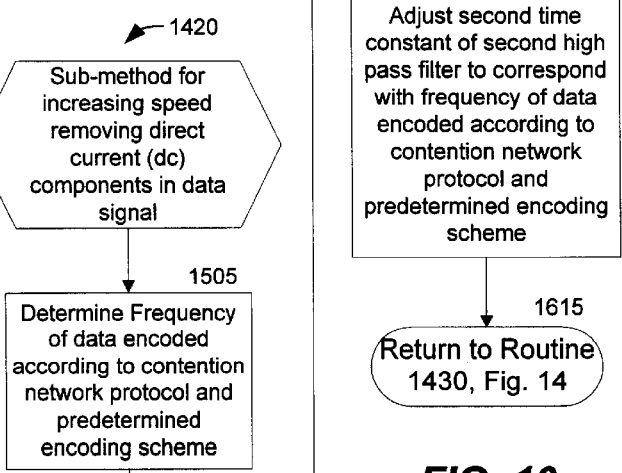
FIG. 16 is a logic flow diagram illustrating an exemplary subprocess for increasing speed to convert serial encoded data into the optical domain.

Referring now to FIG. 16, this figure is a logic flow diagram illustrating a sub-method 1425 for increasing speed to convert serial encoded data into the optical domain. Step 1605 is the first step of the sub-method 1425 in which the frequency of the data encoded according to the network protocol and the predetermined encoding scheme is determined. Next, in step 1610, the second time constant of a second high pass filter circuit 1020 is adjusted to correspond with the frequency of data formatted according to the network protocol and the predetermined encoding scheme.

Specifically, the lowest occupied frequency of the data is determined in this step 1610 and the time constant of this second high pass filter circuit 1020 is adjusted to correspond with this lowest occupied frequency of the data. As noted above with respect to the first high pass filter circuit, other discrete circuit components can be used other than those illustrated in order to form the second high pass filter circuit 1020. For the discrete circuit components illustrated for the second high pass filter circuit 1020, the time constant is adjusted by increasing the capacitance values of the capacitors in this circuit, which in turn, lowers the time constant of the circuit. In step 1615, the process returns to routine 1430 of FIG. 14.

Referring now to FIG. 17, this figure is a logic flow diagram illustrating a sub-method 1430 for increasing speed to power up the laser transmitter 905. The first step of the sub-method 1430 is step 1705 in which the frequency of the data formatted according to the network protocol and that is encoded according to the predetermined encoding scheme is determined. In step 1710, a third time constant of a power level circuit 910 is adjusted to correspond with the frequency of the data formatted according to the protocol and encoded with the predetermined encoding scheme.

Specifically, the time constant of the power level circuit 910 can be lowered to correspond with the lowest occupied frequency of the data that is formatted with the exemplary Gigabit Ethernet that is encoded with 8B/10B encoding. When other network protocols and coding schemes that are different from the ones described in the present specification are used, then the time constant can be adjusted accordingly with such network protocols and encoding schemes. For the exemplary network protocol and exemplary predetermined encoding scheme of the present invention, the time constant of the power level circuit 910 is typically lowered by adjusting the capacitance of a portion of the circuit. Specifically, the capacitance for the circuits is usually increased.

As noted above, circuit components other than those illustrated in the drawings and discussed in the present specification can be used without departing from the scope and spirit of the present invention. When circuit components other than those illustrated are employed, these values can also be adjusted to manipulate the time constant of the power level circuit 910. In step 1715, the process returns to step 1435 of FIG. 14.

Referring now to FIG. 18, this Figure is a logic flow diagram illustrating an exemplary process 1800 for increasing upstream communication speed in an optical network. Step 1805 is the first step in the process 1800 for increasing upstream communication speed in an optical network. In step 1805, optical data formatted according to a predetermined network protocol and encoded according to a predetermined encoding scheme and transmitted according to a predetermined timing scheme is received by an optical receiver 370.

Specifically, an optical detector circuit 1210 can receive the optical data formatted according to the network protocol, encoded with the predetermined encoding scheme here, and according to a predetermined timing scheme. As noted above, according to one exemplary embodiment of the present invention, the network protocol can comprise Gigabit Ethernet while the predetermined encoding scheme can comprise 8B/10B encoding. Further, the predetermined timing scheme can comprise time division multiple access (TDMA). However, other predetermined network protocols, predetermined encoding schemes, and predetermined timing schemes are not beyond the scope and spirit of the present invention. For example, other network protocols can include, but are not limited to, Fiber Distributed Data Interface (FDDI) and Digital Video Broadcasting-Asynchronous Serial Interface (DVB-ASI). Other encoding schemes can include, but are not limited to, 16B/18B and 64B/66B encoding. Meanwhile, other data transmit timing schemes can include, but are not limited to, time division multiplexing (TDM) or code division multiple access (CDMA).

In routine 1810, the speed in which an optical detector circuit 1210 can receive optical signals is increased by adjusting a first time constant of the circuit. Further details of routine 1810 will be discussed below with respect to FIG. 19. In routine 1815, the speed in which a detecting circuit 1210 can adjust between receiving different signals can be increased by adjusting a second time constant of an automatic gain control circuit 1215. Further details of routine 1815 will be discussed below with respect to FIG. 20.

In routine 1820, the speed in which a limiting or conversion circuit 1220 that can receive and convert electrical data to optical data is increased by adjusting a third time constant of the limiting/conversion circuit 1220. Further details of routine 1820 will be discussed below with respect to FIG. 21. And lastly, in step 1825, the encoded optical data transmitted according to a predetermined timing scheme is converted into electrical data by the limiting/conversion circuit 1220.

Referring now to FIG. 19, this figure is an exemplary logic flow diagram illustrating the sub-method 1810 for increasing speed to receive upstream optical data signals. Step 1905 is the first step of the sub-method 1810 in which the frequency of the data formatted according to the predetermined network protocol, predetermined encoding scheme, and predetermined timing scheme is determined. Next, in step 1910, the first time constant of a photo detector circuit 1210 is adjusted to correspond with the frequency of the data formatted according to the predetermined network protocol, predetermined encoding scheme, and predetermined timing scheme.

Specifically, the optical detector circuit 1210 is adjusted to handle the lowest occupied frequency of the data formatted according to the predetermined network protocol, and encoded according to the predetermined encoding scheme and transmitted according to the predetermined timing scheme. For the exemplary network protocol, exemplary encoding scheme, and exemplary timing scheme mentioned above, the time constant of the optical detector circuit 1210 can be lowered by lowering the capacitance values of the circuit.

However, as noted above, circuit components other than those illustrated in the figures can be used to form the optical detector circuit 1210. In such cases, the time constant can be adjusted by changing the values of these other circuit components. Also, the time constant of the optical detector circuit 1210 can be increased depending upon the predetermined network protocol, predetermined encoding scheme, and predetermined timing scheme employed. In step 1915, the process returns to routine 1815 of FIG. 18.

Referring now to FIG. 20, this figure illustrates an exemplary sub-method 1815 for increasing the speed to adjust gain between optical data signals. The first step of sub-method 1815 is step 2005 in which the frequency of the data formatted according to the predetermined network protocol, predetermined encoding scheme, and predetermined timing scheme is determined. In step 2010 the second time constant of a gain control circuit 1215 is adjusted to correspond with the frequency of the data that is formatted according to the predetermined network protocol, predetermined encoding scheme, and predetermined timing scheme.

Specifically, for the predetermined network protocol, predetermined encoding scheme, and predetermined timing scheme for the present invention, the time constant of the gain control circuit 1215 is lowered by increasing the capacitance values of that circuit. However, if circuit components other than those illustrated for the automatic gain control 1215 are employed, then the values of these other circuit components could be adjusted in order to change the time constant thereof. Further, if a network protocol, a predetermined encoding scheme, and a predetermined timing scheme other than those mentioned are employed, then the time constant could be raised or lowered depending upon the lowest occupied frequency of the data with such protocols, encoding schemes, and timing schemes. In step 2015, the process returns to routine 1820 of FIG. 18.

Referring now to FIG. 21, this Figure is a logic flow diagram illustrating an exemplary sub-method 1820 for increasing the speed to convert optical data signals to electrical data signals. Step 2105 is the first step in the sub-method 1820 in which the frequency of the data formatted according to the predetermined network protocol, predetermined encoding scheme, and predetermined timing scheme is determined. In step 2110, a third time constant of the limiting conversion circuit 1220 is adjusted to correspond with the frequency of the data that is formatted according to the predetermined network protocol, predetermined encoding scheme, and predetermined timing scheme.

And as mentioned above, if circuit components other than those illustrated for the exemplary limiting/conversion circuit 1220 are used, then the values of these other circuit components can be adjusted to manipulate the time constant thereof. And if other network protocols, encoding schemes, and timing schemes are used, then the time constant may be lowered or increased depending upon the lowest occupied frequency of the data formatted according to these protocols and schemes. In step 2115, the process returns to step 1825 of FIG. 18.

The predetermined network protocol comprising Gigabit Ethernet and the predetermined encoding scheme comprising 8B/10B encoding allows the present invention to increase the transmission speed of upstream optical communications when a predetermined timing scheme such as time division multiple access is used in the optical network. As mentioned above, Gigabit Ethernet with 8B/10B encoding comprises a higher minimum occupied frequency for a given transmission rate compared to that of other conventional optical network protocols such as SONET. With the higher minimum occupied frequency, this allows a transmitter and a receiver to be constructed with lower time constants and resulting in significantly increased speed in transitioning from one transmitter to another when a predetermined timing scheme such as TDMA is employed by the upstream optical communications.

It should be understood that the foregoing relates only to illustrate the embodiments of the present invention, and that numerous changes may be made therein without departing from the scope and spirit of the invention as defined by the following claims.

What is claimed is:

1. A method for increasing upstream communication in an optical network comprising the steps of:

receiving serial electrical data;

formatting the serial electrical data with a network protocol;

encoding the formatted data with a predetermined coding scheme for providing adequate transitions per code group of the data to facilitate clock recovery;

increasing a speed to remove direct current components from the serial data by adjusting a time constant of a first portion of a driver circuit according to a predetermined frequency of the data that is dependent upon the network protocol and encoding scheme;

increasing a speed to convert the serial encoded data in to the optical domain by adjusting a time constant of a second portion of the driver circuit according to the predetermined frequency;

increasing a speed to power up an optical transmitter by adjusting a time constant of a power level circuit according to the predetermined frequency; and converting the encoded electrical data into optical data.

2. The method of claim 1, wherein the step of formatting the electrical data comprises the step of formatting the electrical data according to a Gigabit Ethernet protocol.

3. The method of claim 1, further comprising the step of propagating the optical data in accordance with a predetermined timing scheme comprising time division multiple access (TDMA).

4. The method of claim 1, wherein the predetermined frequency of the data comprises an occupied frequency of the protocol when the data comprises a maximum number of like bits permitted by the protocol.

5. The method of claim 1, wherein the step of encoding the formatted data with a predetermined coding scheme comprises encoding the formatted data in accordance with an 8B/10B coding scheme.

6. The method of claim 1, wherein the step of increasing the speed to remove direct current (dc) components from the serial data comprises adjusting a time constant of a high pass filter circuit of the driver circuit.

7. The method of claim 6, wherein the step of adjusting a time constant of a high pass filter circuit comprises lowering the time constant by decreasing capacitance of the high pass filter to correspond with the predetermined frequency of the data.

8. The method of claim 1, wherein the step of increasing the speed to convert the serial encoded data in to the optical domain comprises adjusting a time constant of a high pass filter circuit of the driver circuit.

9. The method of claim 8, wherein the step of adjusting a time constant of the high pass filter of the driver circuit comprises lowering the time constant by decreasing capacitance of the high pass filter circuit to correspond with the predetermined frequency of the data.

10. The method of claim 1, wherein the step of increasing the speed to power up an optical transmitter comprises adjusting a time constant of a high pass filter circuit of the power level circuit.

11. The method of claim 10, wherein the step of adjusting a time constant of a high pass filter circuit comprises lowering the time constant by decreasing capacitance of the high pass filter circuit to correspond with the predetermined frequency of the data.

* * * * *